US012775781B2

(12) United States Patent
Rao et al.

(10) Patent No.: US 12,775,781 B2
(45) Date of Patent: Oct. 27, 2026

(54) EDIT ATTENTION MANAGEMENT

(71) Applicant: Abridge AI, Inc., Pittsburgh, PA (US)

(72) Inventors: Shivdev Rao, Pittsburgh, PA (US); Sandeep Konam, Pittsburgh, PA (US)

(73) Assignee: Abridge AI, Inc., Pittsburgh, PA (US)

(*) Notice: Subject to any disclaimer, the term of this patent is extended or adjusted under 35 U.S.C. 154(b) by 14 days.

(21) Appl. No.: 18/444,311

(22) Filed: Feb. 16, 2024

(65) Prior Publication Data

US 2024/0281596 A1 Aug. 22, 2024

Related U.S. Application Data

(60) Provisional application No. 63/447,429, filed on Feb. 22, 2023.

(51) Int. Cl.

| | |
|---|---|
| ***G06F 40/169*** | (2020.01) |
| ***G06F 40/109*** | (2020.01) |
| ***G06F 40/289*** | (2020.01) |
| ***G06F 40/40*** | (2020.01) |

(52) U.S. Cl.

CPC .......... *G06F 40/169* (2020.01); *G06F 40/109* (2020.01); *G06F 40/289* (2020.01); *G06F 40/40* (2020.01)

(58) Field of Classification Search

CPC .... G06F 40/169; G06F 40/109; G06F 40/289; G06F 40/40

See application file for complete search history.

(56) References Cited

U.S. PATENT DOCUMENTS

| | | | | |
|---|---|---|---|---|
| 6,212,498 | B1 * | 4/2001 | Sherwood | G10L 15/063 704/235 |
| 11,694,460 | B1 * | 7/2023 | Luo | G06N 3/044 382/176 |
| 2003/0229487 | A1 * | 12/2003 | Wang | G06F 40/53 704/4 |
| 2017/0228239 | A1 * | 8/2017 | Elassaad | G06F 16/904 |
| 2019/0121532 | A1 * | 4/2019 | Strader | G16H 80/00 |
| 2019/0206524 | A1 * | 7/2019 | Baldwin | G06F 40/169 |
| 2021/0042343 | A1 * | 2/2021 | Rings | G06F 18/22 |

(Continued)

OTHER PUBLICATIONS

Konam, S., & Rao, S. (2021). Abridge: A Mission Driven Approach to Machine Learning for Healthcare Conversation. Journal of Commercial Biotechnology, 26(2)., in view of Schloss, B., & Konam, S. (Sep. 2020). Towards an automated SOAP note: classifying utterances from medical conversations. (Year: 2020).*

(Continued)

*Primary Examiner* — Philip H Lam

(74) *Attorney, Agent, or Firm* — Fenwick & West LLP

(57) ABSTRACT

Handling multi-loop feedback for machine learning model pipelines may be provided by providing a review graphical user interface (GUI) including an analysis output, generated by a machine learning model, of a natural language conversation, the analysis output including a transcript and a summary of the natural language conversation based on the transcript; identifying a first candidate phrase and a second candidate phrase in the analysis output; emphasizing the first candidate phrase in the review GUI; in response to receiving a review action in relation to the first candidate phrase: deemphasizing the first candidate phrase; and emphasizing the second candidate phrase in the review GUI.

20 Claims, 19 Drawing Sheets

(56) References Cited

U.S. PATENT DOCUMENTS

| | | | | |
|---|---|---|---|---|
| 2021/0099317 | A1* | 4/2021 | Hilleli | G06F 40/216 |
| 2021/0133279 | A1* | 5/2021 | Shirani | G06N 3/042 |
| 2022/0179904 | A1* | 6/2022 | Ahlstrom | G06F 16/345 |
| 2022/0318522 | A1* | 10/2022 | Wolf | G06N 3/09 |
| 2023/0360640 | A1* | 11/2023 | Asi | G06F 40/35 |
| 2023/0419966 | A1* | 12/2023 | Roper | G06F 40/274 |

OTHER PUBLICATIONS

Schloss, B., & Konam, S. (Sep. 2020). Towards an automated SOAP note: classifying utterances from medical conversations. In machine learning for healthcare conference (pp. 610-631). PMLR. (Year: 2020).*

Krishna, K., Khosla, S., Bigham, J. P., & Lipton, Z. C. (2020). Generating SOAP notes from doctor-patient conversations using modular summarization techniques. arXiv preprint arXiv:2005.01795. (Year: 2020).*

Biswas, P. K., & Iakubovich, A. (2021). Extractive summarization of call transcripts. arXiv preprint arXiv:2103.10599. (Year: 2021).*

* cited by examiner

EDIT ATTENTION MANAGEMENT

CROSS REFERENCE TO RELATED APPLICATIONS

The present disclosure claims priority to U.S. Provisional Application Ser. No. 63/447,429 filed Feb. 22, 2023 and titled "EDIT ATTENTION MANAGEMENT", which is incorporated herein by reference in its entirety.

BACKGROUND

Machine Learning (ML) is a branch of Artificial Intelligence (AI) directed to developing AI models that continuously improve or "learn" based on training data to make predictions (and take corresponding actions) on new data. Machine Learning Models (MLM) are used in a variety of applications, including in Natural Language Processing (NLP) for computer systems to understand freeform text and spoken words. Human speech, despite various grammatical rules, is generally unstructured, as there are myriad ways for a human to express one concept using natural language. Accordingly, processing human speech into a structured format usable by computing systems is a complex task for NLP systems to perform, and one that calls for great accuracy if the output of the NLP systems is to be trusted by human users for sensitive tasks.

Despite advances in the accuracy of NLP systems, some contexts still include a Human in the Loop (HIL) to correct deficiencies in the output of the NLP systems and identify training examples for improving the operation of the NLP system. The persons in the HIL role are referred to herein as "annotators", who may one of the persons participating in a conversation under analysis, a non-participant end user of the transcript or a summary thereof, or a third party that is neither an end user nor a participant from the conversation.

SUMMARY

The present disclosure is generally related to Artificial Intelligence (AI) and User Interface (UI) design and implementation useful for the analysis of transcripts of spoken natural language conversations.

The present disclosure provides methods and apparatuses (including systems and computer-readable storage media) to interact with various Machine Learning Models (MLM) trained to convert spoken utterances to written transcripts and summaries of those transcripts as part of a Natural Language Processing (NLP) system.

Because annotators charged with verifying the output of the NLP system may be under various constraints, the present disclosure provides UI features that are tied to end-user goals and AI confidence to direct annotators to the most-pressing segments of a transcript/summary for human feedback. These segments may be prioritized for correction/verification differently by different users (e.g., the operator of the MLM model, a first end-user, a second end-user). Accordingly, the UI manages which segments are highlighted, and in which order, to increase the effectiveness of the inputs requested from the annotator to satisfy the overall most-pressing segments. As feedback is received from the annotator, the UI adjusts where the annotator's attention is to be directed for receiving additional feedback.

In some embodiments, the MLMs of the NLP are leveraged to allow the annotator to more quickly address cascading errors, thereby using the system to autocorrect or re-analyze the conversation in response to human edits to provide suggestions before the annotator arrives a next candidate phrase for editing in the analysis output.

Accordingly, the present disclosure is generally directed to increasing and improving the functionality, efficiency, and usability of the underlying computing systems and MLMs via the various methods and apparatuses described herein via an improved UI.

One embodiment of the present disclosure is a method to perform various operations, a system including a processor and a memory including instructions that when executed by the processor perform various operations, and a memory device that includes instructions that when executed by a processor perform various operations, the operations comprising: providing a review graphical user interface (GUI) including an analysis output, generated by a machine learning model, of a natural language conversation, the analysis output including a transcript and a summary of the natural language conversation based on the transcript; identifying a first candidate phrase and a second candidate phrase in the analysis output; emphasizing the first candidate phrase in the review GUI; in response to receiving a review action in relation to the first candidate phrase: deemphasizing the first candidate phrase; and emphasizing the second candidate phrase in the review GUI.

One embodiment of the present disclosure is a method to perform various operations, a system including a processor and a memory including instructions that when executed by the processor perform various operations, and a memory device that includes instructions that when executed by a processor perform various operations, the operations comprising: providing a review graphical user interface (GUI) including an analysis output, generated by a machine learning model, of a natural language conversation, the analysis output including a transcript and a summary of the natural language conversation based on the transcript; identifying a first candidate phrase and a second candidate phrase in the transcript; querying the machine learning model for a first summarized phrase in the summary corresponding to the first candidate phrase and a second summarized phrase in the summary corresponding to the second candidate phrase; emphasizing the first candidate phrase and the first summarized phrase in the review GUI; in response to receiving a review action in relation to the first candidate phrase: deemphasizing the first candidate phrase and the first summarized phrase; and emphasizing the second candidate phrase and the second summarized phrase in the review GUI.

One embodiment of the present disclosure is a method to perform various operations, a system including a processor and a memory including instructions that when executed by the processor perform various operations, and a memory device that includes instructions that when executed by a processor perform various operations, the operations comprising: providing a review graphical user interface (GUI) including an analysis output, generated by a machine learning model, of a natural language conversation, the analysis output including a transcript and a summary of the natural language conversation based on the transcript; identifying a first candidate phrase and a second candidate phrase in the summary; querying the machine learning model for a first supporting phrase in the transcript on which the first candidate phrase is based and a second supporting phrase in the transcript on which the second candidate phrase is based; emphasizing the first candidate phrase and the first supporting phrase in the review GUI; in response to receiving a review action in relation to the first candidate phrase: deemphasizing the first candidate phrase; emphasizing the second candidate phrase; and emphasizing the second supporting phrase while the second candidate phrase is emphasized.

BRIEF DESCRIPTION OF THE DRAWINGS

The accompanying figures depict various elements of the one or more embodiments of the present disclosure, and are not considered limiting of the scope of the present disclosure.

In the Figures, some elements may be shown not to scale with other elements so as to more clearly show the details. Additionally, like reference numbers are used, where possible, to indicate like elements throughout the several Figures.

It is contemplated that elements and features of one embodiment may be beneficially incorporated in the other embodiments without further recitation or illustration. For example, as the Figures may show alternative views and time periods, various elements shown in a first Figure may be omitted from the illustration shown in a corresponding second Figure without disclaiming the inclusion of those elements in the embodiments illustrated or discussed in relation to the second Figure.

Figure 1:
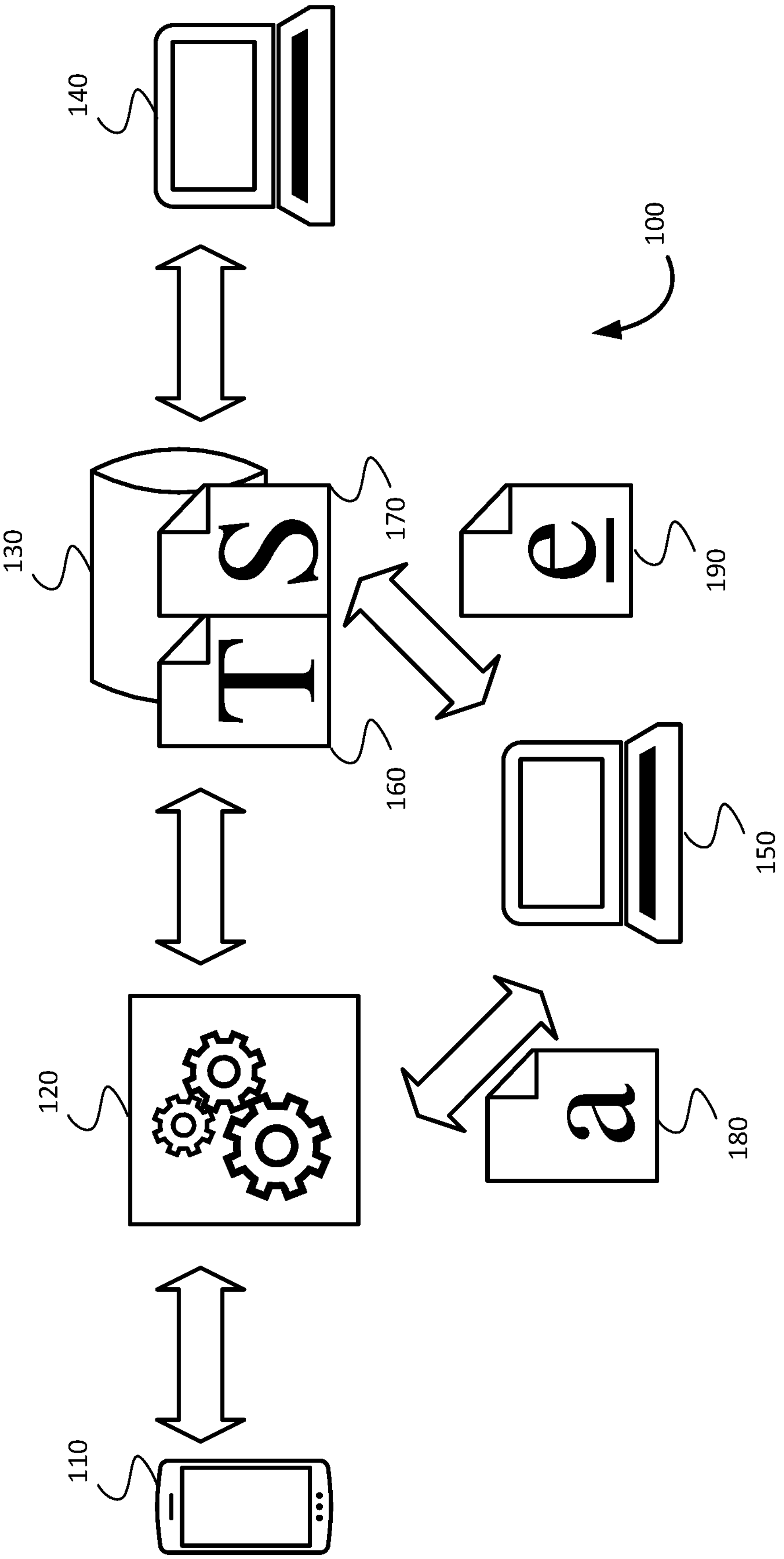

FIG. 1 illustrates an example environment that an auditing User Interface can be provided, according to embodiments of the present disclosure.

Figure 2:
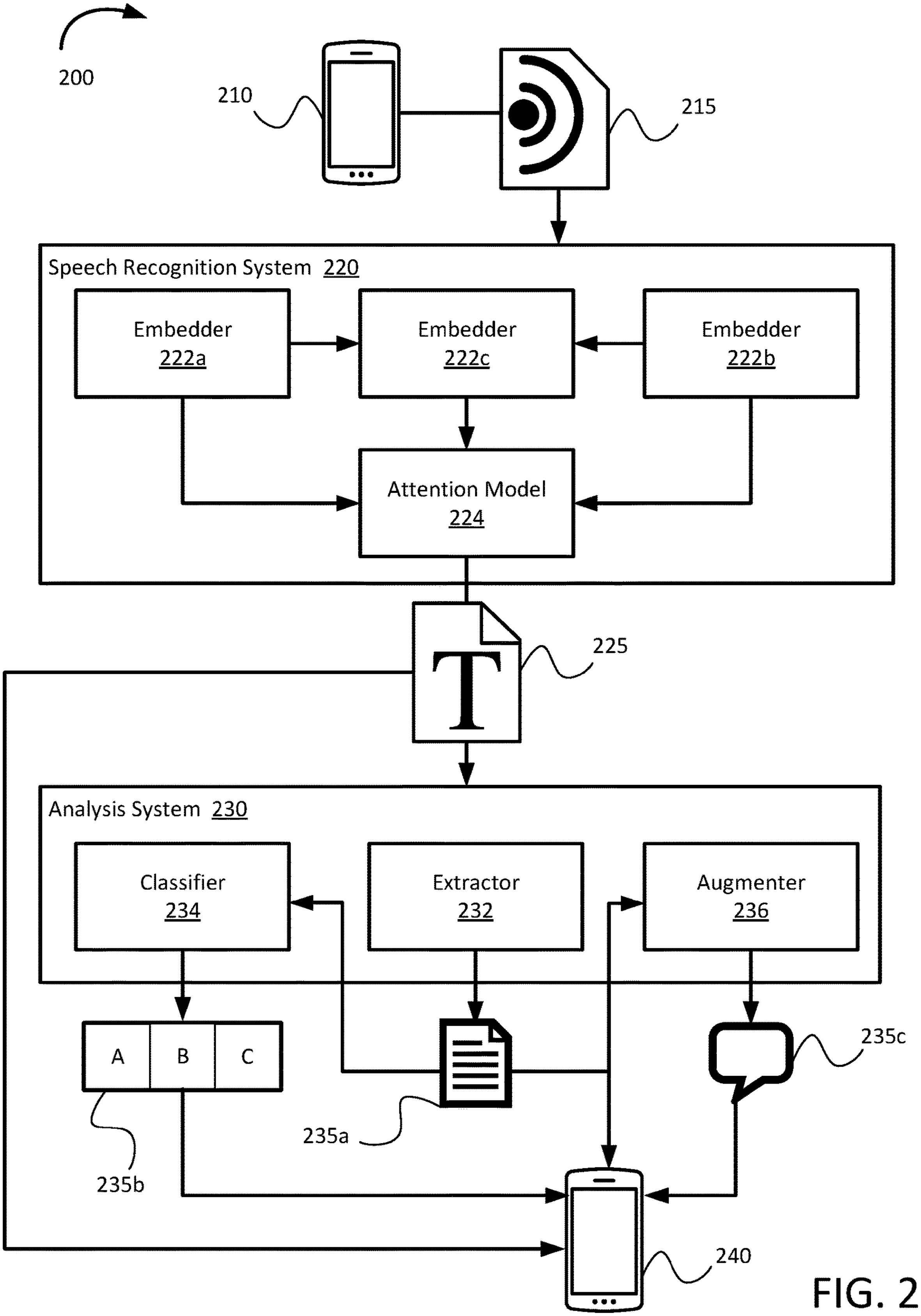

FIG. 2 illustrates a computing environment, according to embodiments of the present disclosure.

Figure 3:
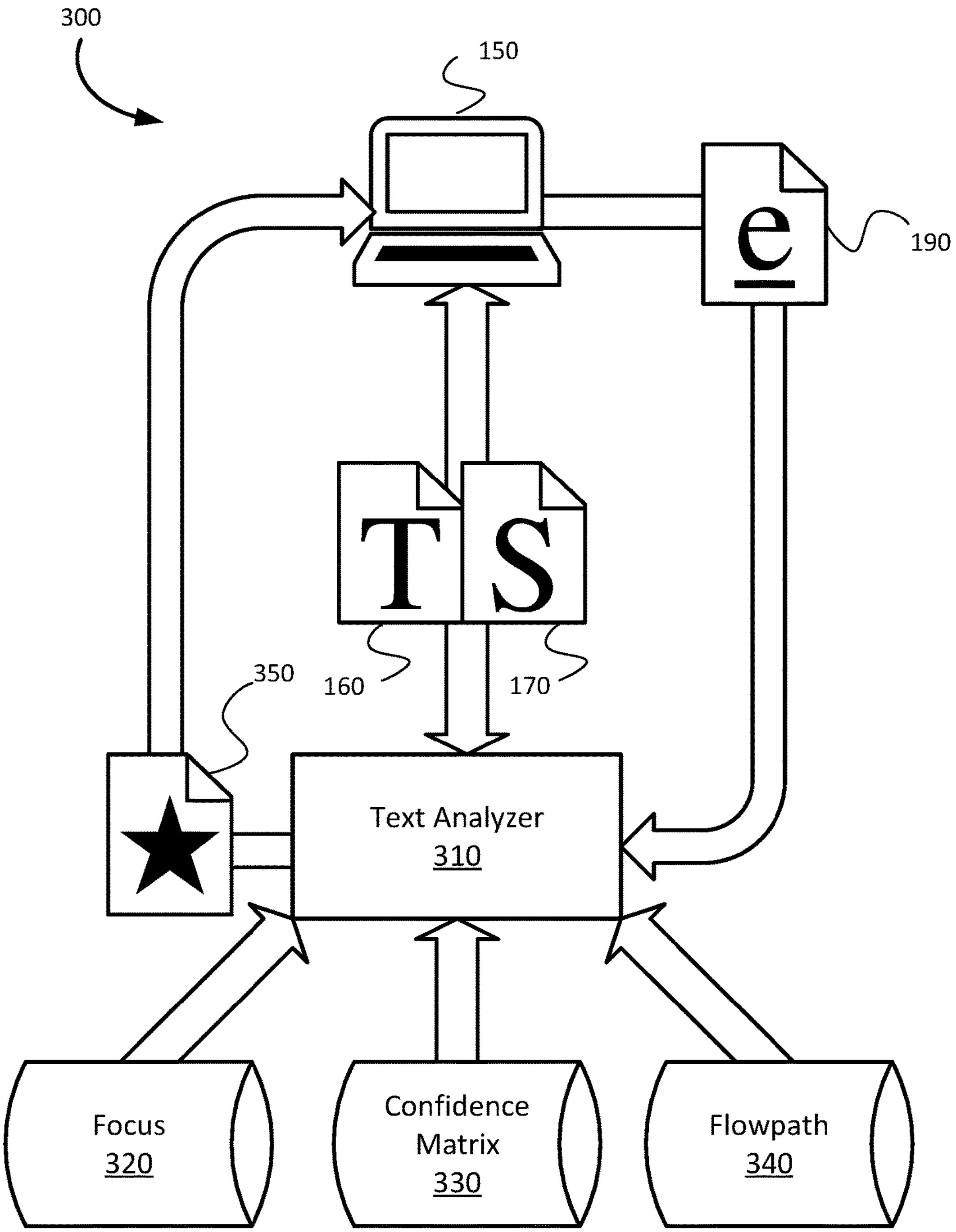

FIG. 3 illustrates an editing pipeline generator, according to embodiments of the present disclosure.

Figure 4A:
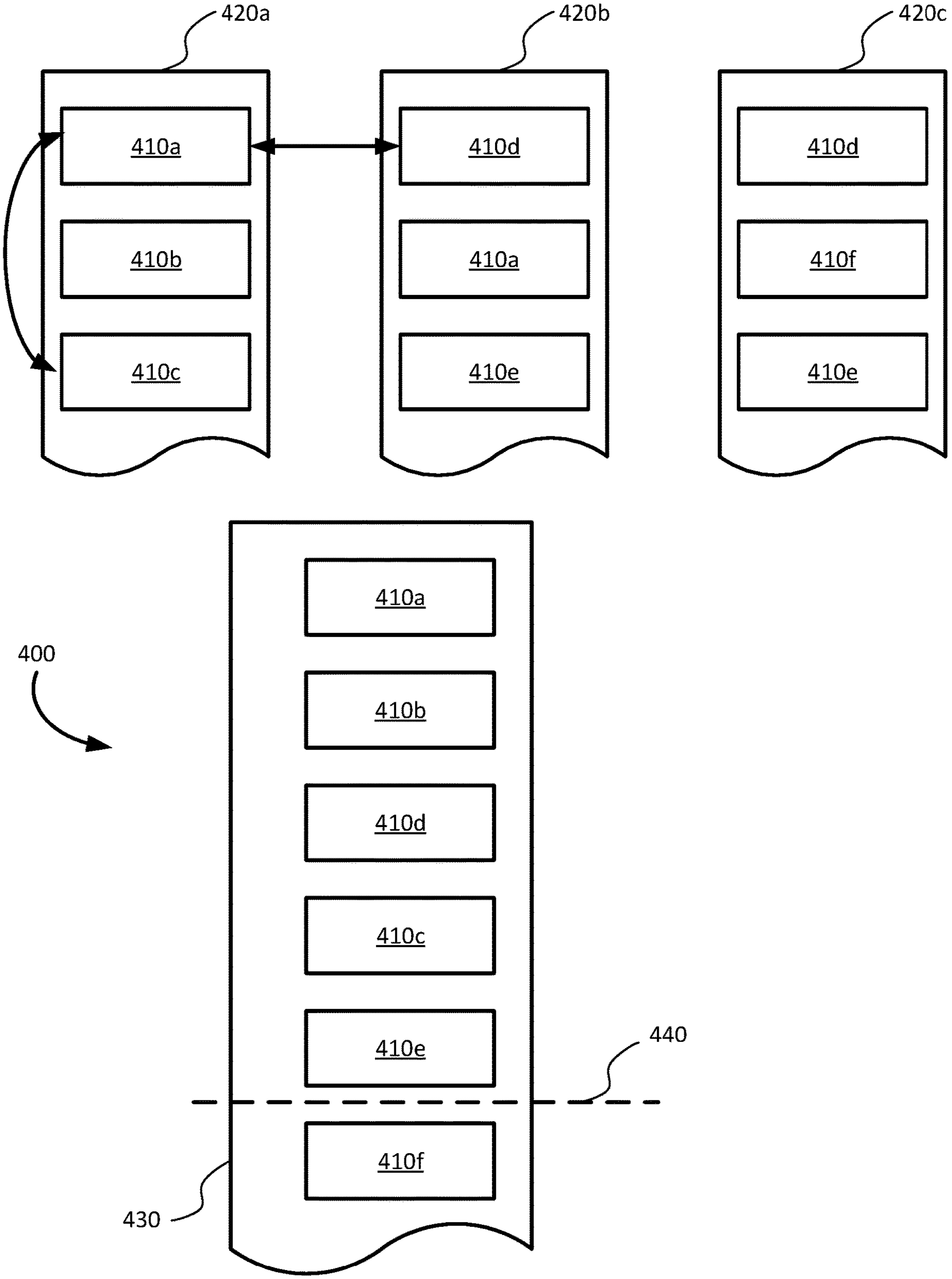
Figure 4B:
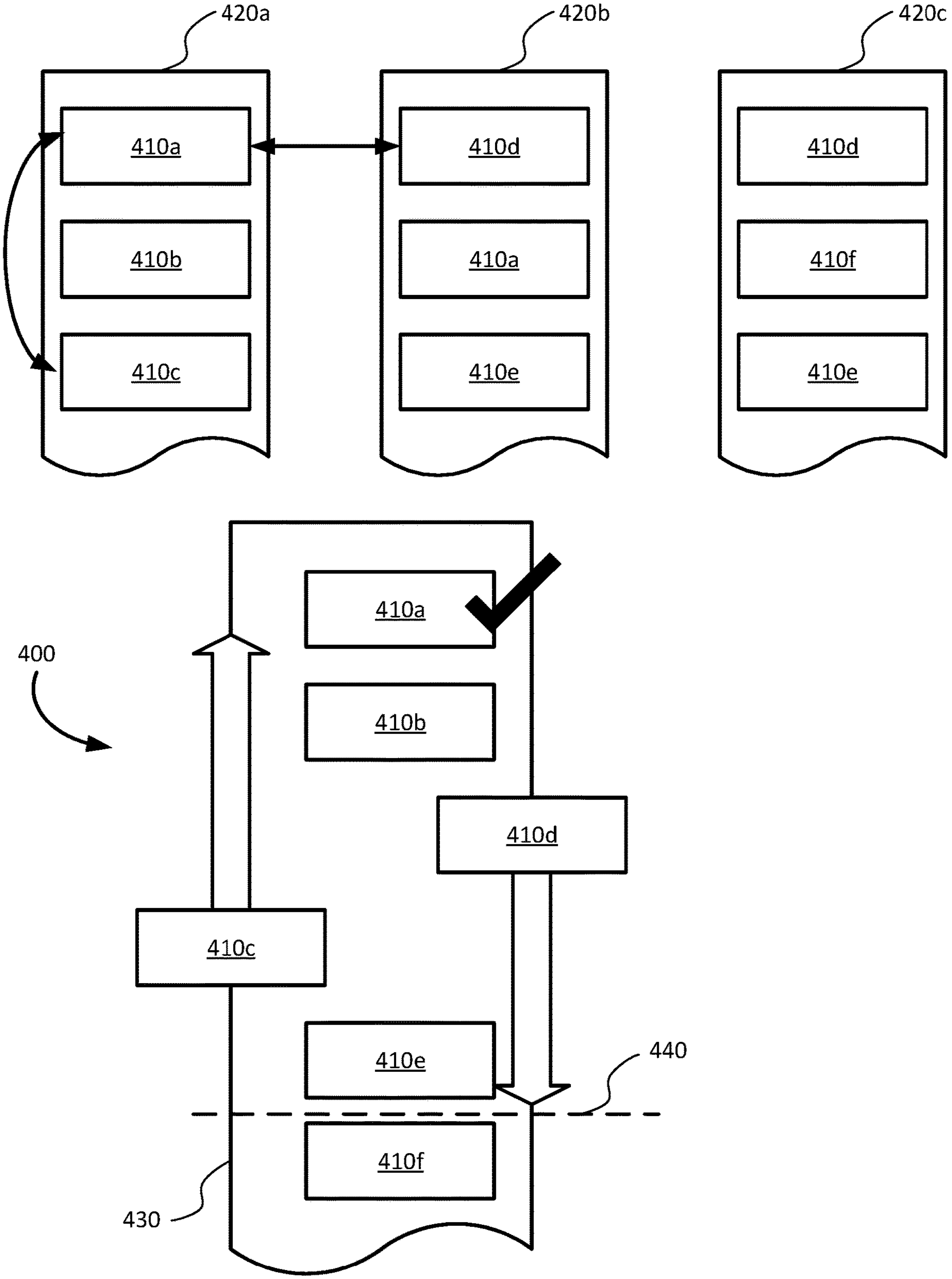
Figure 4C:
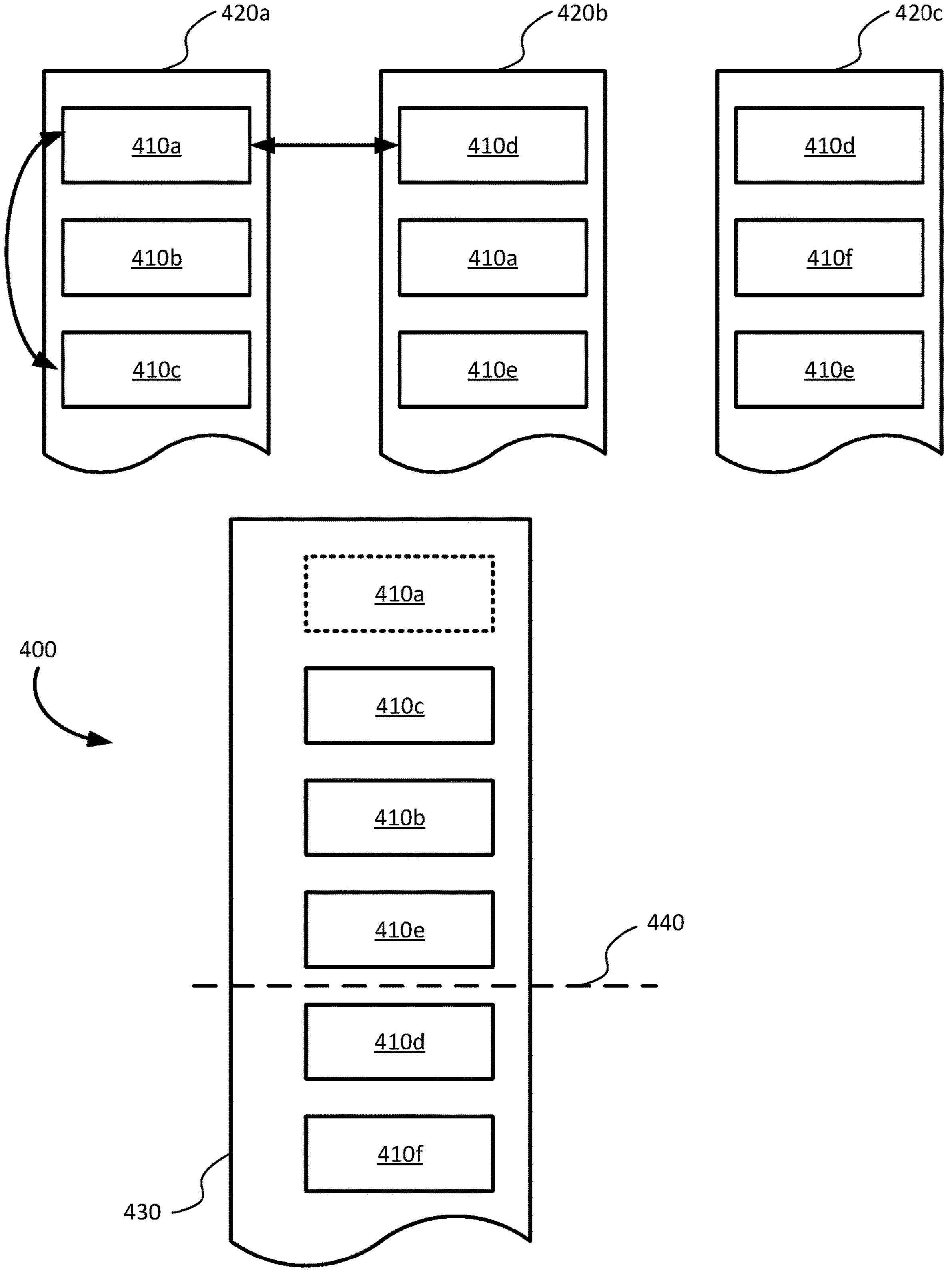

FIGS. 4A-4C illustrate ranking segments among competing priorities for presentation as candidate phrases to an annotator, according to embodiments of the present disclosure.

FIGS. 5A-5F illustrate interactions with an annotating User Interface that displays a transcript and summaries thereof identified from a conversation, according to embodiments of the present disclosure.

FIGS. 6A-6E illustrate interactions with an annotating User Interface that displays a transcript and summaries thereof identified from a conversation, according to embodiments of the present disclosure.

Figure 7:
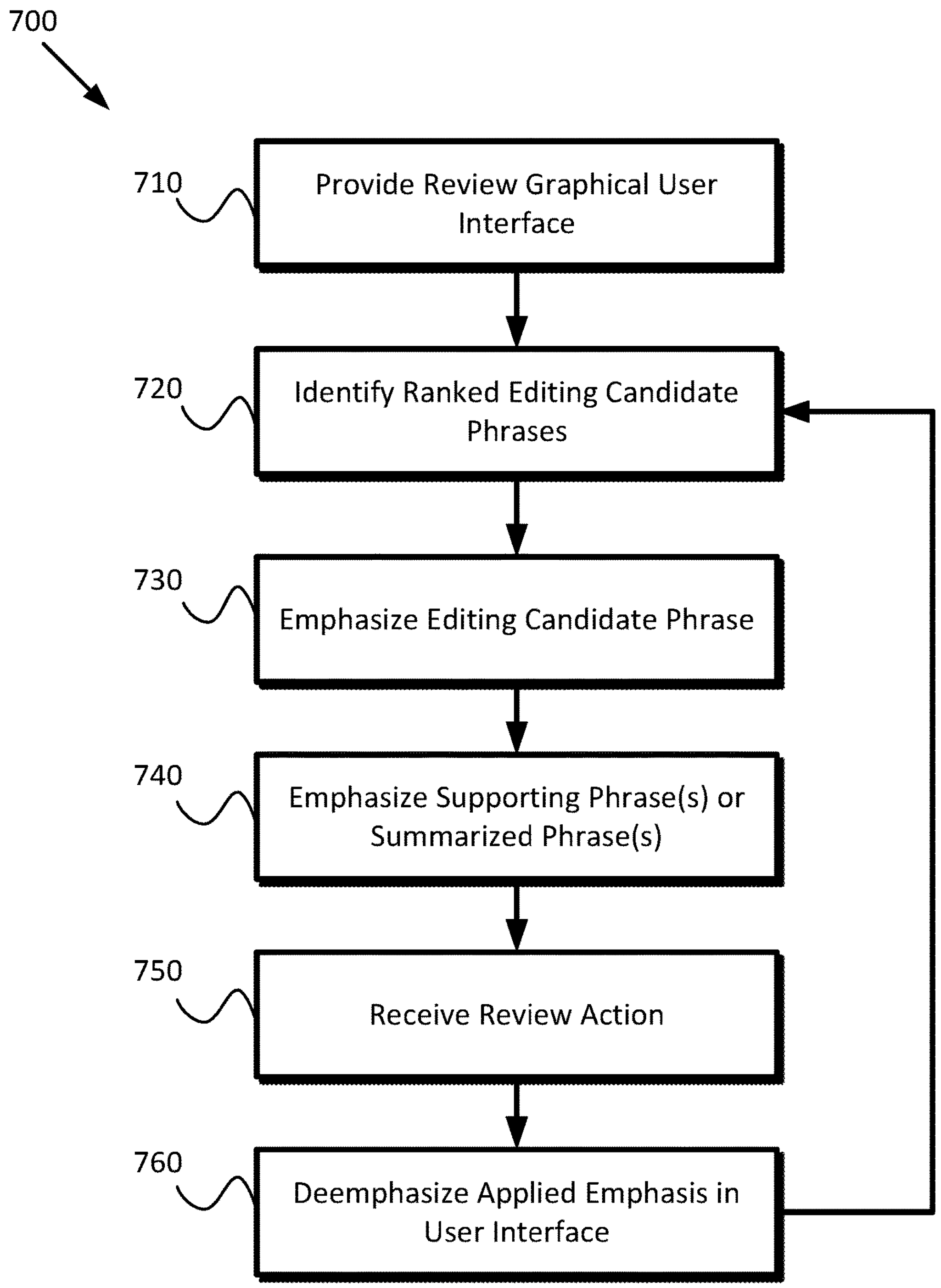

FIG. 7 is a flowchart of an example method for edit attention management, according to embodiments of the present disclosure.

Figure 8:
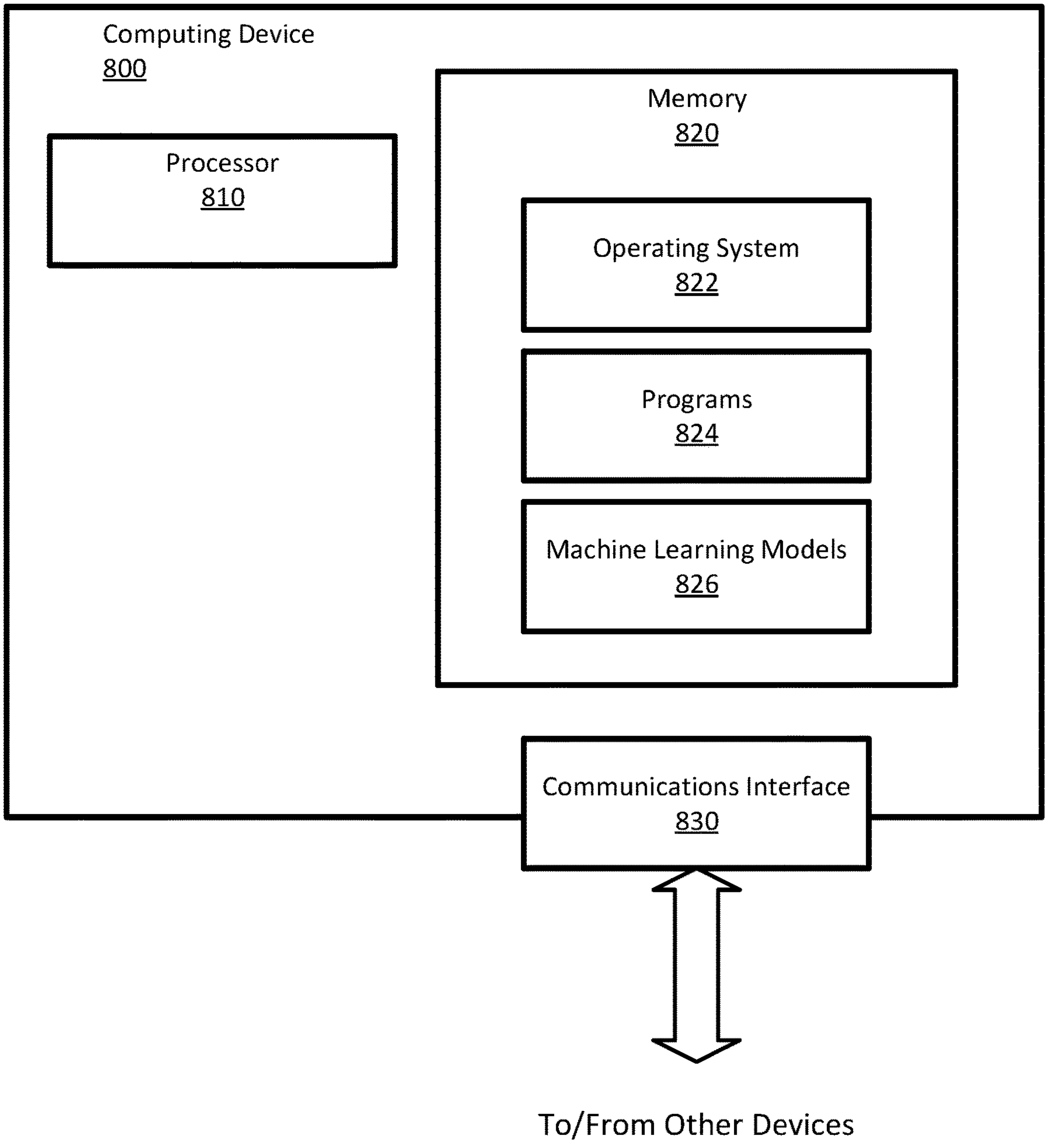

FIG. 8 illustrates an example computing device, according to embodiments of the present disclosure.

DETAILED DESCRIPTION

Because transcripts of spoken conversations are becoming increasingly important in a variety of fields, the accuracy of those transcripts and the accuracy of interpreted elements extracted from those transcripts is also increasing in importance. Accordingly, accuracy in the transcript affects the accuracy in the later analyses, and greater accuracy in transcription and analysis improves the usefulness of the underlying systems used to generate the transcript and analyses thereof.

To create these transcripts and the analyses thereof, the present disclosure describes a Natural Language Processing (NLP) system. As used herein, NLP is the technical field for the interaction between computing devices and unstructured human language for the computing devices to be able to "understand" the contents of the conversation and react accordingly. An NLP system may be divided into a Speech Recognition (SR) system, that generates a transcript from a spoken conversation, and an analysis system, that extracts additional information from the written record (e.g., from a transcript generated by the SR system or an edited version of such a transcript). In various embodiments, the NLP system may use separate Machine Learning Models (MLMs) for each of the SR system and the analysis system, or may use one MLM to handle the SR tasks and the analysis tasks.

Because annotators charged with verifying the output of the NLP system may be under various constraints, the present disclosure provides UI features that are tied to end-user goals and AI confidence to direct annotators to the most-pressing segments of a transcript/summary for human feedback. These segments may be prioritized for correction/verification differently by different users (e.g., the operator of the MLM model, a first end-user, a second end-user). Accordingly, the UI manages which segments are highlighted, and in which order, to increase the effectiveness of the inputs requested from the annotator to satisfy the overall most-pressing segments. As feedback is received from the annotator, the UI adjusts where the annotator's attention is to be directed for receiving additional feedback.

In some embodiments, the MLMs of the NLP are leveraged to allow the annotator to more quickly address cascading errors, thereby using the system to autocorrect or re-analyze the conversation in response to human edits to provide suggestions before the annotator arrives a next candidate phrase (also referred to as editing candidates) in the analysis output.

Accordingly, the present disclosure is generally directed to increasing and improving the functionality, efficiency, and usability of the underlying computing systems and MLMs via the various methods and apparatuses described herein via an improved UI.

FIG. 1 illustrates an example environment 100 in which an annotating User Interface (UI) can be provided, according to embodiments of the present disclosure. A shown in FIG. 1, a recording device 110 in in communication with an NLP system 120 to convert a spoken natural language conversation captured by the recording device 110 into a transcript 160 and various associated summaries 170 of the transcript 160, which are stored in a database 130.

In various embodiments, the recording devices 110 may be any device (e.g., such as the computing device 800 described in relation to FIG. 8) that is capable of recording the audio of the conversation, which may include cellphones, dictation devices, laptops, tablets, personal assistant devices, or the like. In various embodiments, the recording device 110 may transmit the conversation according to various file formats (e.g., WAV, AIFF, FLAC, ATRAC, ALC, WMA, etc.) for processing to a remote service (e.g., via a telephone or data network), locally store or cache the recording of the conversation for later processing (locally or remotely), or combinations thereof. In various embodiments, the recording device 110 may pre-process the recording of the conversation to remove or filter out environmental noise, compress the audio, remove undesired sections of the conversation (e.g., silences or user-indicated portions to remove), which may reduce data transmission loads or otherwise increase the speed of transmission of the conversation over a network.

In various embodiments, the transcripts 160 and summaries 170 may be provided to a consuming device 140 for an end user to consume the transcript 160 and summaries 170, and to an annotating device 150 for an annotating user (e.g., an annotator) to review and edit the transcript 160 or summary 170. In addition to receiving the transcripts 160 and summaries 170 from the database 130, the annotating device 150 is also in communication with the NLP system 120 to send and receive annotations 180 to improve the annotator's ability to make edits 190 to the transcripts 160 and summaries 170 stored in the database 130. In various embodiments, the consuming device 140 and the annotating device 150 may be different devices used by different users, the same device used by the same users but in different modes, and variations thereof. In various embodiments, the consuming device 140 and the annotating device 150 may be any device (e.g., such as the computing device 800 described in relation to FIG. 8) that is capable of sending and receiving digital files for reading/playback and manipulating (e.g., editing) those digital files, which may include cellphones, dictation devices, laptops, tablets, personal assistant devices, or the like.

Recording and transcribing conversations related to healthcare, technology, academia, or various other esoteric topics can be particularly challenging for NLP systems 120 due to the low number of example utterances that include related terms, the inclusion of jargon and shorthand used in the particular domain, the similarities in phonetics of markedly different terms within the domain (e.g., lactase vs. lactose), similar terms having certain meanings inside of the domain that are different from or more specific than the meanings used outside of the domain, mispronunciation or misuse of domain terms by non-experts speaking to domain experts, and other challenges. Accordingly, the annotating device 150 is provided, in some instances, to a human user acting as a Human-in-the-Loop (HiL) or reviewer to provide corrections, notes, suggesting, and feedback to the machine learning models (MLMs) used by the NLP system 120 and to correct any errors or note any ambiguities in the transcripts 160 and summaries 170.

The present disclosure therefore provides for UIs that allow annotators to more readily interact with the transcripts 160 and summaries 170 and to expose various processes of the NLP systems 120 and MLMs that produced the transcripts 160 or summaries 170. The annotator is also enabled to use the NLP systems 120 and MLMs thereof as an editing tool for the specified context of a transcript 160 or summary 170 currently being annotated, rather than a generalized context for all transcripts/summaries produced by the NLP system 120 or annotated previously by the annotating device 140, thereby improving data privacy for the annotation process.

Although the present disclosure primarily uses example conversations related to a healthcare visit as a basis for the examples discussed herein, the present disclosure may be used for the provision and manipulation of data gleaned from conversations related to various topics outside of the healthcare space (e.g., equipment maintenance, education, law, agriculture, etc.). Additionally, although the example conversations and analyzed terms discussed herein are primarily provided in English, the present disclosure may be applied for transcribing and annotating a variety of languages with different vocabularies, grammatical rules, word-formation rules, and use of tone to convey complex semantic meanings and relationships between words.

FIG. 2 illustrates a computing environment 200, according to embodiments of the present disclosure. The computing environment 200 may represent a distributed computing environment that includes multiple computers, such as the computing device 1000 discussed in relation to FIG. 10, interacting to provide different elements of the computing environment 200 or may include a single computer that locally provides the different elements of the computing environment 200. Accordingly, some or all of the elements illustrated with a single reference number or object in FIG. 2 may include several instances of that element, and individual elements illustrated with one reference number or object may be performed partially or in parallel by multiple computing devices.

The computing environment 200 includes an audio provider 210, such as a recording device 110 described in relation to FIG. 1, that provides a recording 215 of a completed conversation or individual utterances of an ongoing conversation to a Speech Recognition (SR) system 220 to identify the various words and intents within the conversation. The SR system 220 provides a transcript 225 of the recording 215 to an analysis system 230 to identify and analyze various aspects of the conversation relevant to the participants. As used herein, the SR system 220 and the analysis system 230 may be jointly referred to as an NLP system.

As received, the recording 215 may include an audio file of the conversation, video data associated with the audio data (e.g., a video recording of the conversation vs. an audio-only recording), as well as various metadata related to the conversation, and may also include video data. For example, a user account associated with the audio provider 210 may serve to identify one or more of the participants in the conversation, or append metadata related to the participants. For example, when a recording 215 is received from an audio provider 210 associated with John Doe, the recording 215 may include metadata that John Doe is a participant in the conversation. The user of the audio provider 210 may also indicate that the conversation took place with Erika Mustermann, (e.g., to provide the identity of another speaker not associated with the audio provider 210), when the conversation took place, whether the conversation is complete or is ongoing, where the conversation took place, what the conversation concerns, or the like.

The SR system 220 receives the recording 215 and processes the recording 215 via various machine learning models to convert the spoken conversation into various words in textual form. The models may be domain specific (e.g., trained on a corpus of words for a particular technical field) or general purpose (e.g., trained on a corpus of words for general speech patterns). In various embodiments, the SR system 220 may use an Embedding from Language Models (ELMo) model or a Bidirectional Encoder Representation from Transformers (BERT) model or other machine learning models to convert the natural language spoken audio into a transcribed version of the audio. In various embodiments, the SR system 220 may use Transformer networks or a Connectionist Temporal Classification (CTC) phoneme based model, a Hidden Markov based model, attention based models, a Listen Attend and Spell (LAS) grapheme based model, or any other model to convert the natural language spoken audio into a transcribed version of the audio. In some embodiments, the analysis system 230 may be a large language model.

Converting the spoken utterances to a written transcript not only matches the phonemes to corresponding characters and words, but also uses the syntactical and grammatical relationship between the words to identify a semantic intent of the utterance. The SR system 220 uses this identified semantic intent to select the most correct word in the context of the conversation. For example, the words "there", "their", and "they're" all sound identical in most English dialects and accents, but convey different semantic intents, and the SR system 220 selects one of the options for inclusion in the transcript for a given utterance. Accordingly, an attention model 224, is used to provide context of the various different candidate words among each other. The selected attention model 224 can use a Long Short Term Memory (LSTM) architecture or Transformers to track relevancy of nearby words on the syntactical and grammatical relationships between words at a sentence level or across sentences (e.g., to identify a noun introduced in an earlier utterance related to a pronoun in a later utterance).

The SR system 220 can include one or more embedders 222*a-c* (generally or collectively embedder 222) to embed further annotations to the transcript 225, such as, for example by including: key term identifiers, timestamps, segment boundaries, speaker identifies, and the like. Each embedder 222 may be a trained MLM to identify various features in the audio recording 215 and/or transcript 225 that are used for further analysis by an attention model 224 or extraction by the analysis system 230.

For example, a first embedder 222*a* is trained to recognize key terms, and may be provided with a set of words, relations between words, or the like to analyze the transcript 225 for. Key terms may be defined to include various terms (and synonyms) of interest to the users. For example, in a medical domain, the names of various medications, therapies, regimens, syndromes, diseases, symptoms, etc., can be set as key terms. In a maintenance domain, the names of various mechanical or electrical components, assurance tests, completed systems, locational terms, procedures, etc., can be set as key terms. In another example, time based words may be identified as candidate key terms (e.g., Friday, tomorrow, last week). Once recognized in the text of the transcript, a key term embedder 222 may embed a metadata tag to identify the related word or set of words as a key term, which may include tagging pronouns associated with a noun with the same metadata tags as the associated noun.

A second embedder 222*b* can be used by the SR system 220 to recognize different participants in the conversation. In various embodiments, individual speakers may be distinguished by vocal patterns (e.g., a different fundamental frequency for each speaker's voice), loudness of the utterances (e.g., identifying different locations relative to a recording device), or the like.

In another example, a third embedder 222*c* is trained to recognize segments within a conversation. In various embodiments, the SR system 220 diarizes the conversation into portions that identify the speaker, and provides punctuation for the resulting sentences (e.g., commas at short pauses, periods at longer pauses, question marks at a longer pause preceded by rising intonation) based on the language being spoken. The third embedder 222*c* may then add metadata tags for who is speaking a given sentence (as determined by the second embedder 222*b*) and group one or more portions of the sentence together into segments based on one or more of a shared theme or shared speaker, question breaks in the conversation, time period (e.g., a segment may be between X and Y minutes long before being joined with another segment or broken into multiple segments), or the like.

When using a shared theme to generate segments, the SR system 220 may use some of the key terms identified by a key term embedder 222 via string matching. For each of the detected key terms identifying a theme, the segment identifying embedder 222 selects a set of nearby sentences to group together as a segment. For example, when a first sentence uses a noun, and a second sentence uses a pronoun for that noun, the two sentences may be grouped together as a sentence. In another example, when a first person provides a question, and a second person provides a responsive answer to that question, the question and the answer may be grouped together as a segment. In some embodiments, the SR system 220 may define a segment to include between X and Y sentences, where another key term for another segment (and the proximity to the second key term to the first) may define ab edge between adjacent segments.

Once the SR system 220 generates a transcript 225 of the identified words from the recording 215, the SR system 220 provides the transcript 225 to an analysis system 230 to generate various analysis outputs 235 from the conversation. In various embodiments, the operations of the SR system 220 are separately controlled from the operations of the analysis system 230, and the analysis system 230 may therefore operate on a transcript 225 of a written conversation or a human-generated transcript (e.g., omitting the SR system 220 from the NLP system or substituting a non-MLM system for the SR system 220). The SR system 220 may directly transmit the transcript 225 to the output device 240 (before or after the analysis system 230 has analyzed the transcript 225), or the analysis system 230 may transmit the transcript 225 to the output device 240 on behalf of the SR system 220 once analysis is complete.

The analysis system 230 may use an extractor 232 to generate readouts 235*a* of the key points to provide human-readable summaries of the interactions between the various identified key terms from the transcript. These summaries include the identified key terms (or related synonyms) and are formatted according to factors for sufficiency, minimality, and naturalness. Sufficiency defines a characteristic for a key point that, if given only the annotated span, a reader should be able to predict the correct classification label for the key point, which encourages longer key points that cover all distinguishing or background information needed to interpret the contents of a key point. Minimality defines a characteristic for a key point that identifies peripheral words which can be replaced with other words without changing the classification label for the key point, which discourages marking entire utterances as needed for the interpretation of a key point. Naturalness defines a characteristic for a key point that, if presented to a human reader should sound like a complete phrases in the language used (or as a meaningful word if the key point has only a single key term) to avoid dropping stop words from within phrases and reduce the cognitive load on the human who uses the NLP system's extraction output.

For example, when presented with a series of sentences from the transcript 225 related to how frequently a user should replace a battery in a device, and what type of battery to use, the extractor 232 may analyze several sentences or segments to identify relevant utterances spoken by more than one person to arrive at a summary. The readout 235*a* may recite "Replace battery; Every year; Use nine volt alkaline" to provide all or most of the relevant information in a human-readable format that was gathered from a much larger conversation.

A category classifier 234 included in the analysis system 230 may operate in conjunction with the extractor 232 to identify various categories 235*b* that the readouts 235*a* belong to. In various embodiments, the categories 235*b* include several different classifications for different users with different review goals for the same conversation. In various embodiments, the category classifier 234 determines the classification based on one or more context vectors developed via the attention model 224 of the SR system 220 to identify whether a given segment or portion of the conversation belongs to which category (including a null category) out of a plurality of potential categories that a user can select from the system to classify portions of the conversation into.

The analysis system 230 may include an augmenter 236 that operates in conjunction with the extractor 232 to develop supplemental content 235*c* to provide with the transcript 225. In various embodiments, the supplemental content 235*c* can include callouts of pseudo-key terms based on inferred or omitted details from a conversation, hyperlinks between key points and semantically relevant segments of the transcript, links to (or provides the content for) supplemental or definitional information to display with the transcript, calendar integration with extracted terms, or the like.

For example, when the extractor 232 identifies terms related to a planned follow up conversation (e.g., "I will call you back in thirty minutes"), the augmenter 236 can generate supplemental content 235*c* that includes a calendar invitation or reminder in a calendar application associated with one or more of the participants that a call is expected thirty minutes from when the conversation took place. Similarly, if the augmenter 236 identifies terms related to a planned follow up conversation that omits temporal information (e.g., "I will call you back"), the augmenter 236 can generate a pseudo-key term to treat the open-ended follow up as though an actual follow up time had been set (e.g., to follow up within a day or set a reminder to provide a more definite follow up time within a system-defined placeholder amount of time).

In various embodiments, when generating supplemental content 235*c* of a hyperlink between an extracted key point and a segment from the transcript, the augmenter 236 links the most-semantically-relevant segment with the key point, to allow users to navigate to relevant portions of the transcript 225 via the key points. As used herein, the most-semantically-relevant segment refers to the one segment that provides the greatest effect on the category classifier 234 choosing to select one category for the key point, or the one segment that provides the greatest effect on the extractor 232 to identify the key point within the context of the conversation. Stated differently, the most-semantically-relevant segment is the portion of the conversation that has the greatest effect on how the analysis system 230 interprets the meaning and importance of the key point within the conversation.

Additionally, the augmenter 236 may generate or provide supplemental content 235*c* for defining or explaining various key terms to a reader. For example, links to third-party webpages to explain or provide pictures of various unfamiliar terms, or details recalled from a repository associated with a key term dictionary, can be provided by the augmenter 236 as supplemental content 235*c*.

The augmenter 236 may format the hyperlink to include the primary target of the linkage (e.g., the most-semantically-relevant segment), various secondary targets to use in updating the linkage based on user feedback (e.g., a next-most-semantically-relevant segment), and various additional effects or content to call based on the formatting guidelines of various programming or markup languages.

Each of the extractor 232, category classifier 234, and the augmenter 236 may be separate MLMs or different layers within one MLM provided by the analysis system 230. Similarly, although illustrated in FIG. 2 with separate modules for an extractor 232, classifier 234, and augmenter 236, in various embodiments, the analysis system 230 may omit one or more of the extractor 232, classifier 234, and augmenter 236 or combine two or more of the extractor 232, classifier 234, and augmenter 236 in a single module. Additionally, the flow of outputs and inputs between the various modules of the analysis system 230 may differ from what is shown in FIG. 2 according to the design of the analysis system 230. When training the one or more MLMs of the analysis system 230, the MLMs may be trained via a first inaccurate supervision technique, such as via fine tuning a large language model, and subsequently by a second incomplete supervision technique to fine-tune the inaccurate supervision technique and thereby avoid catastrophic forgetting. Additional feedback from the user may be used to provide supervised examples for further training of the MLMs and better weighting of the factors used to identify relevancy of various segments of a conversation to the key points therein, and how those key points are to be categorized for review.

The analysis system 230 provides the analysis outputs 235 to an output device 240 for storage or output to a user. In some embodiments, the output device 240 may be the same or a different device from the audio provider 210. For example, a caregiver may record a conversation via a cellphone as the audio provider 210, and receive and interact with the transcript 225 and analysis outputs 235 of the conversation via the cellphone. In another example, the caregiver may record a conversation via a cellphone as the audio provider 210, and receive and interact with the transcript 225 and analysis outputs 235 of the conversation via a laptop computer.

In various embodiments, the output device 240 is part of a cloud storage or networked device that stores the transcript 225 and analysis outputs 235 for access by other devices that supply matching credentials to allow for access on multiple endpoints.

FIG. 3 illustrates an editing pipeline generator 300, according to embodiments of the present disclosure. In various embodiments, the editing pipeline generator 300 is provided as an MLM and the associated modules of computer executable code to identify various action items to follow up on based on a conversation and the information included or omitted therefrom.

A text analyzer 310 accesses a focus database 320, a confidence matrix 330, and an analysis flowpath 340 to determine which terms to emphasize during an annotation session of the transcript 160 and summaries 170 to focus an annotators attention to or away from.

In various embodiments, the text analyzer 310 accesses the user-defined focus database 320 to identify which terms or classes of terms that an end-user has designated as having higher or lower priorities for accurate transcription or summarization relative to other terms or classes of terms. For example, a first user may place greater emphasis for the correctness of terminology in the transcript 160 related to medication names than for other terminology. Accordingly, with other factors being equal, the text analyzer 310 emphasizes the medication names found in the transcript 160 to an annotator before, or to a greater extent, than other terms found in the transcript 160 to ensure that the annotator verifies correct transcription of these terms from the original conversation.

In various embodiments, the text analyzer 310 accesses the confidence matrix 330 received from the MLM used to generate the transcript 160 that identifies various confidences in transcribing terms from the spoken conversation to the written transcript 160 to emphasize terms with lower confidence before, or a greater extent, than terms having higher confidence in transcription. For example, the MLM may have a 90% confidence in a first term being an accurate transcription of the corresponding portion of the conversation and a 95% confidence in a second term being an accurate transcription of the corresponding portion of the conversation, and the confidence matrix 330 therefore indicates to the text analyzer 310 to, with other factors being equal, emphasize the first term before, or to a greater extent than, the second term is emphasized.

Similarly, the confidence matrix 330 also indicates, in some embodiments, the confidence of the MLM used to generate the summaries 170 in how accurate of the summaries 170 represent all or a portion of the transcript 160. Accordingly, the text analyzer 310 can emphasize summaries 170 or terms in the summaries 170 with lower confidence before, or a greater extent, than terms having higher confidence. For example, the MLM may have a 50% confidence in a first summary 170 being an accurate representation of the corresponding portion of the conversation (e.g., due to an ambiguous reading of the transcript 160) and a 95% confidence in a second summary being an accurate representation of a different portion of the conversation, which may be determined independently of the confidence of the MLM in the accuracy of the transcript 160 on which the summaries 170 are based. In the present example, the confidence matrix 330 indicates to the text analyzer 310 that, with other factors being equal, the first summary 170 should be emphasized before, or to a greater extent than, the second summary 170 is emphasized.

In various embodiments, the text analyzer 310 access the analysis flowpath 340 received from the MLM used to generate the transcript 160 to prioritize emphasis of upstream terms or downstream terms in the editing process. As used herein, upstream and downstream identify where an element exists in the flow of generating the transcript 160 and summaries 170 relative to other elements, which may be independent of the order of the terms in the flow of the conversation. In a pipelined MLM, various modules rely on determinations or inputs that are determined "upstream" of a certain module (e.g., by sub-model that occurs earlier in the pipeline) and produce outputs that are used "downstream" of that certain module (e.g., by a sub-model that occurs later in the pipeline). For example, because a summary 170 is generated based on the transcript 160 of the conversation, a summary 170 may generally be considered to be downstream of the portions of the transcript 160 that the summary 170 represents. Similarly, a transcription sub-model may be considered to be upstream of a summarization sub-model in a sequential pipeline of operations in the MLM.

As used herein, "upstream" and "downstream" do not necessarily refer to an order in which terms appear in the conversation. For example, a first utterance that refers to an object as a pronoun (e.g., "I like it", with "it" being the pronoun in question) followed by a second utterance that clarifies what the pronoun refers to (e.g., "I mean, I like the color", with "color" being identified as being represented by "it"), can result in the earlier utterance being considered downstream of the later utterance. The later utterance is upstream of the earlier utterance in this example because the MLM uses the later utterance to analyze and assign semantic meaning to the earlier pronoun, thereby using the second utterance as an input to determine how to interpret the first utterance. Similarly, because the summaries 170 exist outside of the flow of the conversation, the summaries 170 may be considered downstream of the transcript 160 without having a particular order related to the conversational flow.

In some embodiments, when receiving edits to the transcript 160 or summary 170, the text analyzer 310 may place earlier or greater emphasis on errors (or potential errors) that are more upstream compared to other errors that are produced by modules more downstream in the pipeline. For example, all other factors being equal, the text analyzer 310 may initially place greater emphasis on a potential error in the transcript 160 than a potential error in a downstream summary 170, which may be affected by the potential error in the transcript 160.

The text analyzer 310 considers some or all of factors from the focus database 320, confidence matrix, 330, and flowpath 340 when generating an emphasis registry 350 based on various weightings of these factors. Accordingly, although several examples have been given with a caveat of all other factors being equal, these factors may be unequal in practice. The emphasis registry 350 may be included as metadata in the transcript 160 and summaries 170 or as a separate file that identifies portions of the transcript 160 and summaries 170 to be emphasized in the annotator's UI.

In some embodiments, the emphasis registry 350 may define various levels or categories of emphasis that the UI on the annotator device 150 is to apply as user-mapped effects to the transcript 160 or summary 170 (e.g. according to various user preferences), or may specify certain effects to apply to emphasize (or deemphasize) various portions of the transcript 160 or summary 170. These effects may include changes in typeface (e.g., Time New Roman versus Arial), font effects (e.g., bold, underline, italic, strikethrough), text colors, background colors, animations, text sizes, bounding boxes, and combinations thereof. These effects, when applied in the UI, help draw the annotator's attention towards certain portions of the transcript 160 and summaries 170 according to the weightings set via the focus database 320, confidence matrix 330, and analysis flowpath 340.

As the annotator makes edits 190 to the transcript 160 or summary 170, the edits 190 may be provided to the text analyzer 310 to update the emphasis registry 350. For example, after the annotator provides an annotation for a first potential error (e.g., providing a correction or marking as correct) associated with an emphasis in the emphasis registry 350, the text analyzer 310 can generate an updated emphasis registry 350 that removes or alters the effect applied to the first potential error, and may re-rank the other emphases in the emphasis registry 350 based on the update transcript 160 or summary 170. For example, after marking a portion of the transcript 160 as correct, the text analyzer 310 may reduce the level of emphasis placed on downstream elements to the portion of the transcript 160 (e.g., sections of the summary 170 generated based on that portion of the transcript 160). In another example, after marking a portion of the transcript 160 as incorrect and updating the transcript 160 with a correction, the text analyzer 310 may increase the level of emphasis placed on downstream elements (e.g., related sections of the summary 170 generated using the now outdated transcript 160).

In some embodiments, when using a multi-loop feedback schema to improve the summarization of a transcript via the AI-generated and annotator-edited outputs, the loss functions used to train the sub-models are calculated according to Formulas 1 and 2, where ($S_{AI}$, $S_E$) are the AI-generated and the corresponding user-edited pairs for the summaries 170 from the dataset, ($T_{AI+E}$, $T_E$) are the transcript regions used as input to train the sub-model when using AI-generated and edited summaries respectively ($T_{AI+E}$ is created considering both $T_{AI}$ and $T_E$), $W_{AI-C}$ is the loss weight to penalize the edited words in the AI-generated summary, $W_{AI-NC}$ and $W_{E-NC}$ are the loss weights to encourage the model to produce words that were not edited in the AI-generated and the edited summaries, $W_{E\text{-}NC}$ is the loss weight to encourage the model to produce words that are edited in the edited summaries, $\mathbf{1}_{AI-c}(t)$ is the indicator function to signify if the word $x_t$ in the AI-generated summary is edited by the annotator, and $\mathbf{1}_{AI-NC}(t)$ signifies when the word is not edited, $\mathbf{1}_{E\text{-}C}(t)$ and $\mathbf{1}_{E\text{-}NC}(t)$ signify if the word $x_t$ in the corrected output is edited or not edited by the annotator respectively, $L_{penalize}(x_t|x_{<t})$ is a loss function that penalizes the model from producing $x_t$, and $L_{reward}(x_t|x_{<t})$ is a loss function that encourages the model to produce $x_t$.

$$L_{S_{AI}} = \sum_{x \in S_{AI}} (1_{AI-C}(t) w_{AI-C} L_{penalize}(x_t \mid x_{<t}, T_{AI+E}) + 1_{AI-NC}(t) w_{AI-NC} L_{reward}(x_t \mid x_{<t}, T_{AI+E})) \quad \text{Formula 1}$$

$$L_{S_E} = \sum_{x \in S_E} (1_{E-C}(t) w_{E-C} L_{reward}(x_t \mid x_{<t}, T_E) + 1_{E-NC}(t) w_{E-NC} L_{reward}(x_t \mid x_{<t}, T_E)) \quad \text{Formula 2}$$

In some embodiments, the indicator functions used in Formulas 1 and 2, can be found by tracking the annotator's changes as edits are made or by aligning the edits to the AI-generated analysis outputs using algorithms like the Needleman-Wunsch Algorithm.

When retraining the sub-models using the new data in the above described method, the new examples may be added to an existing corpus of examples in the respective dataset to avoid over-fitting the models or "forgetting" lessons previously learned by the model. Additionally, to avoid over-fitting or forgetting, the values set for various loss terms can be used to adjust unintended behavior for various special characteristics (e.g., end-of-sentence markers, punctuation, over-shortening summaries, etc.).

In various embodiments, some of the corrections may be added to the ignored dataset when their inclusion may negatively affect the retraining process. For example, when a threshold number (or percentage) of the analysis outputs have corrections, the corrected output is unrelated to the initial AI-generated analysis output (e.g., changes in semantic meaning), or when the annotator links, during the annotating process, different regions of the transcript 160 as evidence for the correction than the initial inputs selected by the sub-model.

FIGS. 4A-4C illustrate ranking segments among competing priorities for presentation as candidate phrases 410*a-f* (generally or collectively, candidate phrases 410) to an annotator, according to embodiments of the present disclosure. Each of the candidate phrases 410 may incorporate one or more words, or segments of a conversation that an MLM was unable to assign words to (e.g., using timestamps), that can be present to an annotator in a UI to provide feedback for. These candidate phrases 410 can be displayed as part of a transcript 160 or a summary 170 in the UI, and the annotator may provide feedback that confirms the MLM's selection for the contents of the candidate phrase 410 or that rejects the MLM's selection for the contents of the candidate phrase 410 (e.g., replacing or removing the MLM-selected contents).

The various candidate phrases 410 may be ranked according to different priorities in one or more ranked lists 420*a-c* (generally or collectively, ranked list 420) for individual priorities, or according to a collective list 430 that incorporates two or more, potentially competing, priorities from among the ranked lists 420.

For example, a first ranked list 420*a* may be ranked according to a certainty demand level prioritized by an end user, while a second ranked list 420*b* ranks the candidate phrases 410 according to a confidence level of the MLM in the accuracy of the candidate phrases 410 in representing the conversation, while a third ranked list 420*c* ranks the candidate phrases 410 according to an analysis order in a sequential pipeline in the MLM for generating the analysis output. Accordingly, each of the ranked lists 420 may include various entries in various orders, and which of the candidate phrases 410 are deemed "most important" according to a first priority may be deemed less important according to a second priority, as is reflected in the different ranked lists 420. For example, as illustrated, the first ranked list 420*a* indicates that the first candidate phrase 410*a* has the highest priority when analyzed according to a certainty demand level, while the second ranked list 420*b* and the third ranked list 420*c* both indicate (independently) that the fourth candidate phrase 410*d* has the highest priority when analyzed according to a confidence level of the MLM and a pipeline analysis order of the MLM, respectively.

The various priorities used by the ranked lists 420 may be weighted by the MLM to generate the collective list 430 to rank the various candidate phrases 410 across priorities. The system identifies candidate phrases from the collective list 430 in the indicated order to sequentially emphasize in the GUI 400 for an annotator to provide feedback for. When generating the collective list 430, the MLM may initially apply a weighting to each of the candidate phrases 410 to rank the corpus of candidate phrases 410*a-f* according to a combination of the priorities. For example, as shown in FIG. 4A, when initially combined, according to the priorities of the three ranked lists 420*a-c*, the first candidate phrase 410*a* (ranked first in the first ranked list 420*a* and second in the second ranked list 420*b*) is ranked first overall, the second candidate phrase 410*b* (ranked second in the first ranked list 420*a* and not in any of the other ranked lists 420) is ranked second overall, the fourth candidate phrase 410*d* (ranked first in the second ranked list 420*b* and the third ranked list 420*d*) is ranked third overall, etc. Accordingly, the GUI 400 sequentially emphasizes the candidate phrases 410 in the order shown in the collective list 430.

However, because these candidate phrases 410 are identified to be actively reviewed by an annotator, and may have various relationships between one another, the overall ranking conveyed by the collective list 430 may change as a human reviewer provides feedback. Rather than re-ranking the entire set of candidate phrases 410 each time a review action is taken (e.g., confirming the accuracy of the candidate phrase 410 or providing an edit to or replacement for the candidate phrase 410), the MLM can identify which phrases are related to one another and adjust the weighting of only the related phrases based on the type of review action taken by the annotator and the type of relation.

For example, the first candidate phrase 410*a* is shown as related to the third candidate phrase 410*c* and to the fourth candidate phrase 410*d*. If the first candidate phrase 410*a* is a summary of a medical visit, the third candidate phrase 410*c* is a summary of a medication discussion during the medical visit, and the fourth candidate phrase 410*d* is a portion of the transcript related to the medication prescribed, verification of or an edit to the first candidate phrase 410*a* may affect how the MLM prioritizes the related third and fourth candidate phrases 410, but have no (or little) effect on the other candidate phrases 410*c-d*. Accordingly, as shown in FIG. 4B, when the annotator confirms the contents of the first candidate phrase 410, the MLM adjusts the relative ranks of the third and fourth candidate phrases 410*c-d.*

The example adjustment from FIG. 4B results in the re-ranking shown in FIG. 4C, in which the third candidate phrase 410*c* is ranked highest (moving upward two places in the rank), the second candidate phrase 410*b* is ranked second (moving downward one place), the fifth candidate phrase 410*e* is ranked third (moving upward one place), and the fourth candidate phrase 410*d* is ranked fourth (moving downward two places). Various candidate phrases 410 may move upward or downward in the ranking, or remain in the same relative position, based on the applied adjustments.

When using the collective list 430 to sequentially emphasize different portions of a transcript 160 or summary 170 for review by an annotator, the system can thereby adjust the next most relevant candidate phrase 410, and dynamically change the order of presentation based on the editing or verification feedback received from the annotator.

In various embodiments, the collective list 430 includes all of the ranked candidate phrases 410, but includes a cutoff threshold 440 to indicate when the candidate phrases 410 with a score or ranking below the cutoff threshold may be omitted from presentation in the UI. For example, as shown in FIG. 1A, the cutoff threshold 440 is shown between the fifth candidate phrase 410*e* and the sixth candidate phrase 410*f*; indicating that the emphasis of the candidate phrases in the UI may be considered complete after emphasizing the fifth candidate phrase 410*e* (e.g., not presenting the sixth candidate phrase 410*f* for feedback). The position of the cutoff threshold 440 can also be dynamically adjusted based on the edits or verifications received from the annotator (e.g., altering the scores of the candidate phrases 410) or the amount of time used by the annotator is providing the feedback.

For example, a cutoff threshold 440 may initially be set to include the number of edits that the annotator is estimated to be able to complete in a fixed amount of time, but as the annotator is faster or slower to provide feedback than initially estimated, or the estimated complexity of the next n-highest ranked candidate phrases 410 changes (e.g., due to reordering the candidate phrases 410), the relative location of the cutoff threshold 440 in the collective list 430 may be altered.

FIGS. 5A-5F illustrate a graphical users interface (GUI) 500 with an annotator editing contents of a transcript 160 and summaries 170 thereof with initial edits made to the transcript 160, according to embodiments of the present disclosure. Using a conversation between a doctor and a patient as a non-limiting example, the GUI 500 illustrated in FIGS. 5A-5F shows a perspective for an annotator adapted interface, but in various embodiments, other conversations may relate to different conversational domains taken from different perspectives than those illustrated in the current example.

Figure 5A:
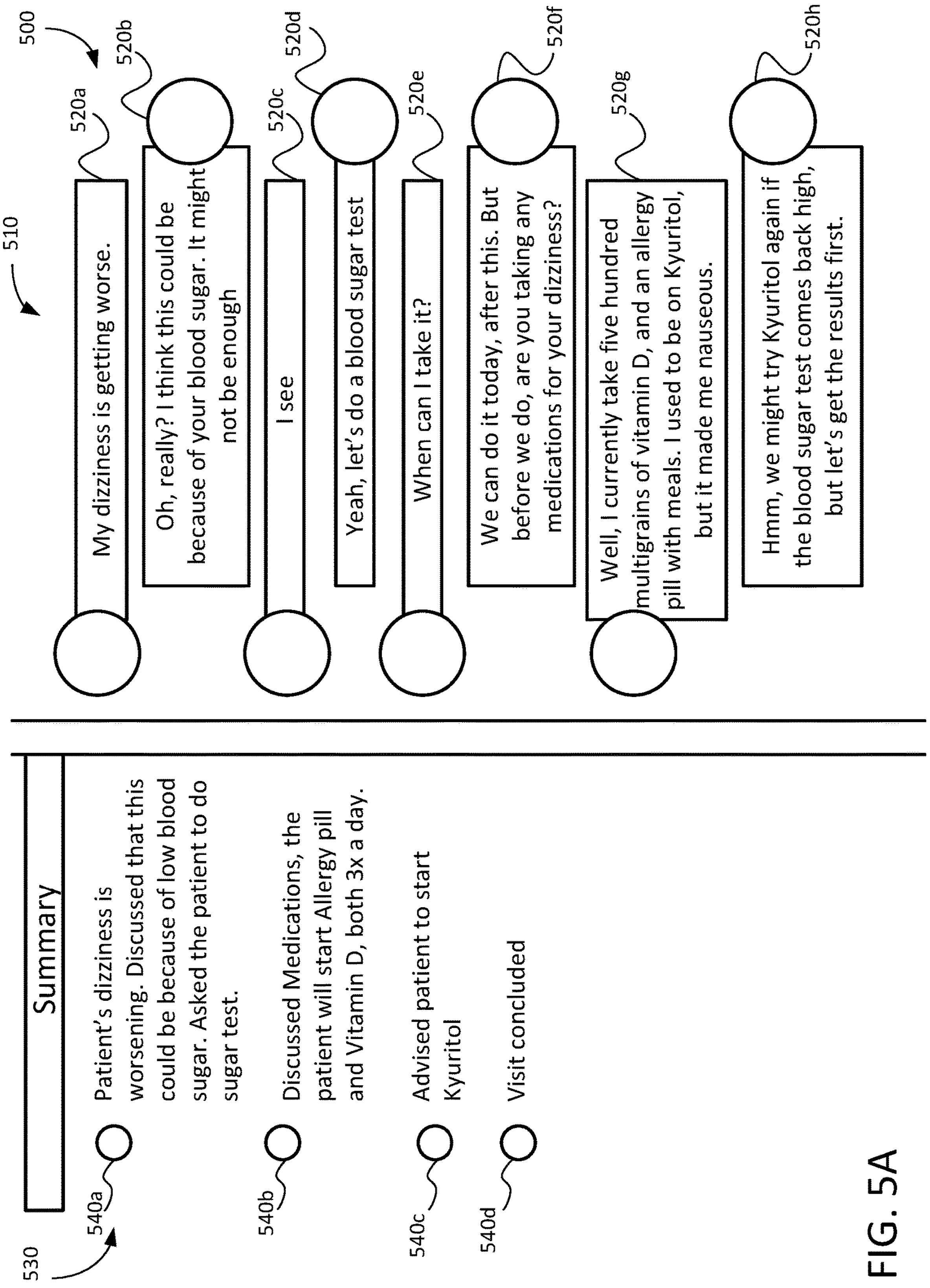

FIG. 5A illustrates a first state of the GUI 500, as may be provided to an annotator after initial analysis of an audio recording of a conversation by an NLP system 120. The transcript is shown in a transcript window 510, which includes several segments 520*a*-520*h* (generally or collectively, segment 520) identified within the conversation. In various embodiments, the segments 520 may represent speaker turns in the conversation, sentences identified in the conversation, topics identified in the conversation, a given length of time in the conversation (e.g., every X seconds), combinations thereof, and other divisions of the conversation.

Each segment 520 includes a portion of the written text of the transcript 160, and provides a UI element that allows the user to access the corresponding audio recording, make edits to the transcript, zoom in on the text, and otherwise receive additional detail for the selected portion of the conversation. The transcript illustrated in FIGS. 5A-5F may represent an entire conversation or a portion of the transcript such that the GUI 500 may omit portions of the transcript from initial display. For example, the GUI 500 may initially display only the segments 520 from which key terms or candidate terms appear (e.g., to skip introductory remarks or provide a summary), with the non-displayed segments 520 being omitted from display (e.g., positioned “off screen” for later access), shown as thumbnails, etc.

In various embodiments, additional data or metadata related to the segment 520 (e.g., speaker, topic, confidence in written text accurately matching input audio, whether edited by a user) can be presented based on color or shading of the segment 520 or alignment of the segment 520 in the transcript window 510. For example, the first segment 520*a*, third segment 520*c*, fifth segment 520*e*, and seventh segment 520*g* are shown as left-aligned versus the second segment 520*b*, fourth segment 520*d*, sixth segment 520*f*, and eighth segment 520*h*, which are shown as right-aligned, which indicates different speakers for the differently aligned segments 520. In another example, the seventh segment 520*g* is displayed with a different shading than the other segments 520, which may indicate that the NLP system is confident that human error is present in the third segment 320*c*, that the NLP system is not confident in the transcribed words matching the spoken utterance, or another aspect of the seventh segment 520*g* that deserves additional attention from the annotator.

Depending on the display area available to present the GUI 500, the transcript window 510 may include some or all of the segments 520 at a given time. Accordingly, although not illustrated, in various embodiments, the transcript window 510 may include various content controls (e.g., scroll bars, text size controls, etc.) to enable access to more content than can be legibly displayed at one time on the device outputting the GUI 500. For example, content controls can allow a user to scroll to currently off-screen elements, zoom in on elements below a size threshold or presented as thumbnails when not selected, or the like.

Outside of the transcript window 510, the GUI 500 displays a summary window 530 with one or more summarized representations 540*a-d* (generally or collectively, representation 540). The representations 540 provide summarizations of the key points extracted from the conversation and selectable controls that, in response to selection by a user, adjust the display of the segments 520 in the transcript window 510 to highlight the segments 520 on which the selected representation 540 is based. Accordingly, the representations 540 allow for easy navigation of the transcript based on the extracted summaries.

Figure 5B:
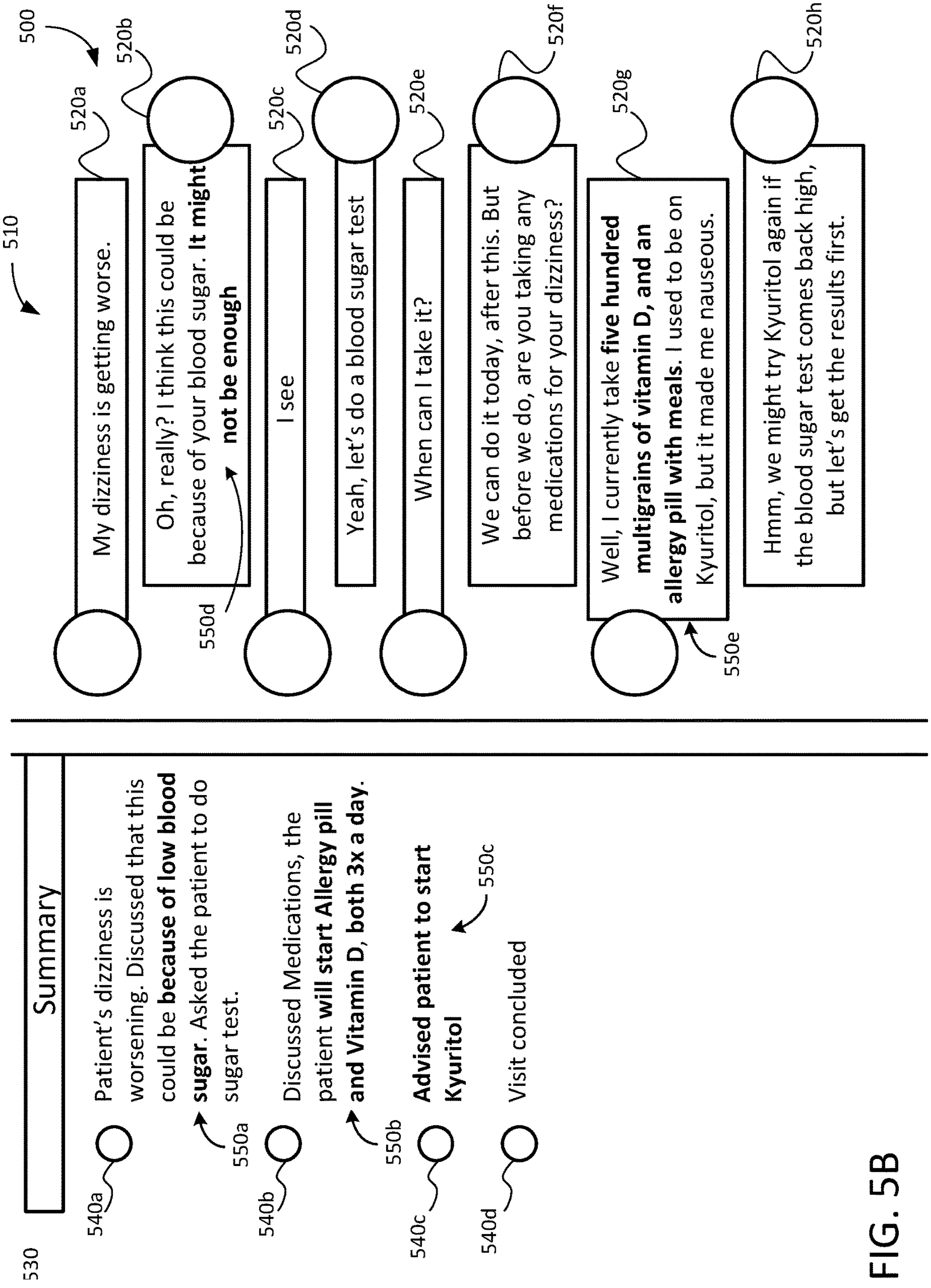

FIG. 5B shows the GUI 500 with emphases applied to candidate phrases 410 in the segments 520 and representations, such as may populate a collective list 430 as described in FIGS. 4A-4C, to draw an annotator's attention to certain areas for confirmation or correction during the annotation process. These emphases may be displayed according to various effects including increasing the size of the text to emphasize relative to other text, decreasing the size of text to deemphasize (or not emphasize) relative to other text, changing a color of portions of the text, applying a font effect (e.g., bold, underline, strikethrough, italics, and combination thereof), applying an animation, applying a bounding box, changing a color of a background to the text, changing where in the GUI 500 the text is displayed (e.g., centering a viewing window), other like highlighting techniques, and combinations thereof.

Additionally, the GUI 500 can display linkages between the portions of the transcript (e.g., in the segments 520) and the summaries (e.g., in the representations 540) that are related to one another to allow the annotator to draw parallels between the transcript 160 and the summaries 170 thereof or more readily identify whether the transcript 160 has been properly summarized by the MLM.

In the example illustrated in FIG. 5B, all of the candidate phrases 410 are shown with applied emphases as emphasized text 550*a-d* (generally or collectively, emphasized text 550), while the examples shown in FIGS. 5C-5F show the candidate phrases 410 being displayed in sequence, to draw the annotator's attention from candidate phrase to candidate phrase in an ordered fashion according to the ranking/positioning of the candidate phrases 410 within a collective list 430. In various embodiments, the GUI 500 may also display linkages to related portions of the transcript and summaries that the annotator may navigate to outside of the sequential example given herein. Additionally, the examples shown in FIGS. 5C-5F emphasize associated text 570*a-c* (generally or collectively, associated text 570) using a different emphasis effect (shown as italics) than the effect applied to the corresponding emphasized text 550 (shown in boldface). In various embodiments, the GUI shown in FIG. 5B may be shown in response to an annotator switching to or initiating an annotation mode, to provide an overview of the identified (or remaining) elements in the transcript 160 or summary 170 for annotation. In various embodiments, the annotator may transition from an overview (as in FIG. 5B) to a sequential review (as in FIGS. 5C-5F) or begin with a sequential review, where the GUI presents the most-pressing candidate phrase 410 for review by the annotator and advances to the next-most-pressing candidate phrase 410 as feedback is received.

FIGS. 5C-5F show the emphasized text 550 occurring in the summary 170, as presented in various representations 540, with the corresponding associated text 570 occurring in the transcript 160, as presented in the various segments 520. In these examples, the associated text 570 represents evidence used by the MLM to generate the portion of the summary 170 in which a certain emphasized text 550 occurs. Additionally, to further draw the annotator's attention to the emphasized text 550 and surrounding context, the GUI 500 provides an editing box 560 with various controls to aid the annotator in making edits or marking the emphasized text 550 as being correct or otherwise not to be edited.

As the annotator makes edits to correct errors and omissions (in substance or style), or marks candidate phrases 410 as being correct or otherwise not to be edited, new emphasis effects can be applied one at time to the next-most-pressing candidate phrase 410 and the supporting evidence to downstream elements affected by an edit or be applied to new elements that previously were not emphasized.

For example, the GUI 500 may apply emphasis to up to a threshold number of elements at one time such that the n elements with the highest emphasis score (e.g., as determined by the text analyzer 310) are initially emphasized, and when one element is addressed, the element with the next highest emphasis score (e.g., element n+1) is then emphasized. Additionally or alternatively to using a current version of an emphasis registry 350, and as is described in greater detail in regard to FIG. 3, the annotator device 150 can send the edits 190 to the text analyzer 310 to produce an updated emphasis registry 350, which can provide additional emphasis targets, remove certain emphasis targets, and re-order how the emphasis targets are ranked for the GUI 500 to provide an updated set of up to n emphasized elements in the transcript 160 and summaries 170.

Figure 5C:
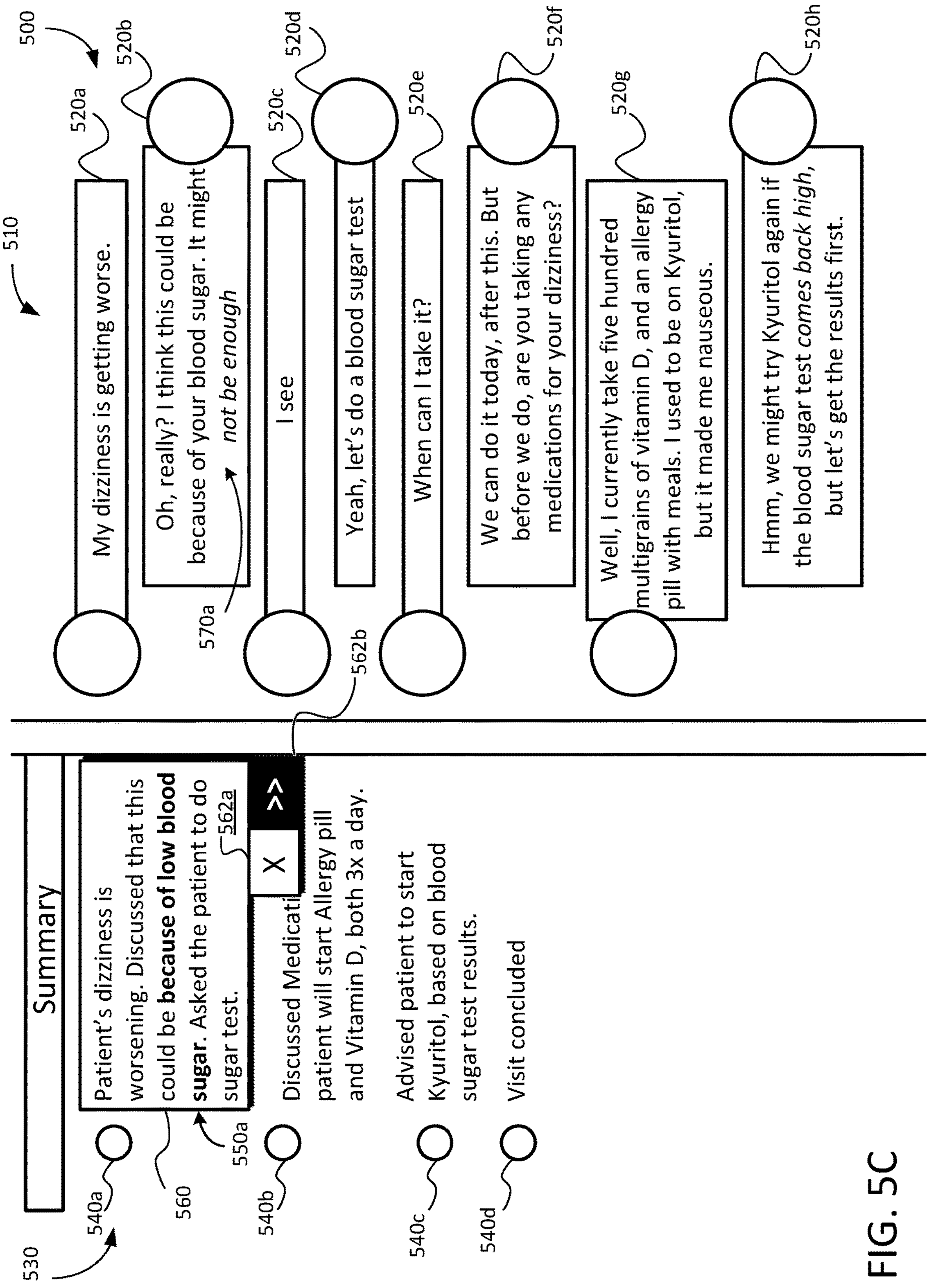

In FIG. 5C, the GUI 500 presents the annotator with a text box 560 showing text of the first representation 540*a* with a first emphasized text 550*a* of "because of low blood sugar" for analysis by the annotator. The GUI 500 also applies a different text effect to the first associated text 570*a* in the second segment 520*b* to help draw the annotator's attention to at least some of the evidence that the MLM used to generate the first emphasized text 550*a*. The text box 560 includes navigation controls 562*a-d* (generally or collectively, navigation controls 562) to begin an editing process (e.g., the first navigation control 562*a*), or move to another candidate in the summary 170 or transcript (e.g., the second navigation control 562*b*). In various embodiments, when the user selects the second navigation control 562*b* (as is shown in FIG. 5C), the GUI 500 accepts the selection as an indication that the emphasized text 550 is correct or otherwise not to be edited, and advances to update the display to highlight the next candidate for the annotator's attention (e.g., according to a collective list 430).

As discussed in relation to FIGS. 4A-4C, the ranking of the individual candidate phrases 410 in the collective list 430 can be updated according to the editing choices (e.g., the edits made to the text, or decision to proceed without making edits) made by the annotator. Accordingly, the selections and edits made in the GUI 500 are transmitted to the MLM on selection by the annotator, which the MLM can use to update the relative order of entries in the collective list 430 to determine which candidate phrase 410 to next show to the annotator when advancing through the annotation process.

Figure 5D:
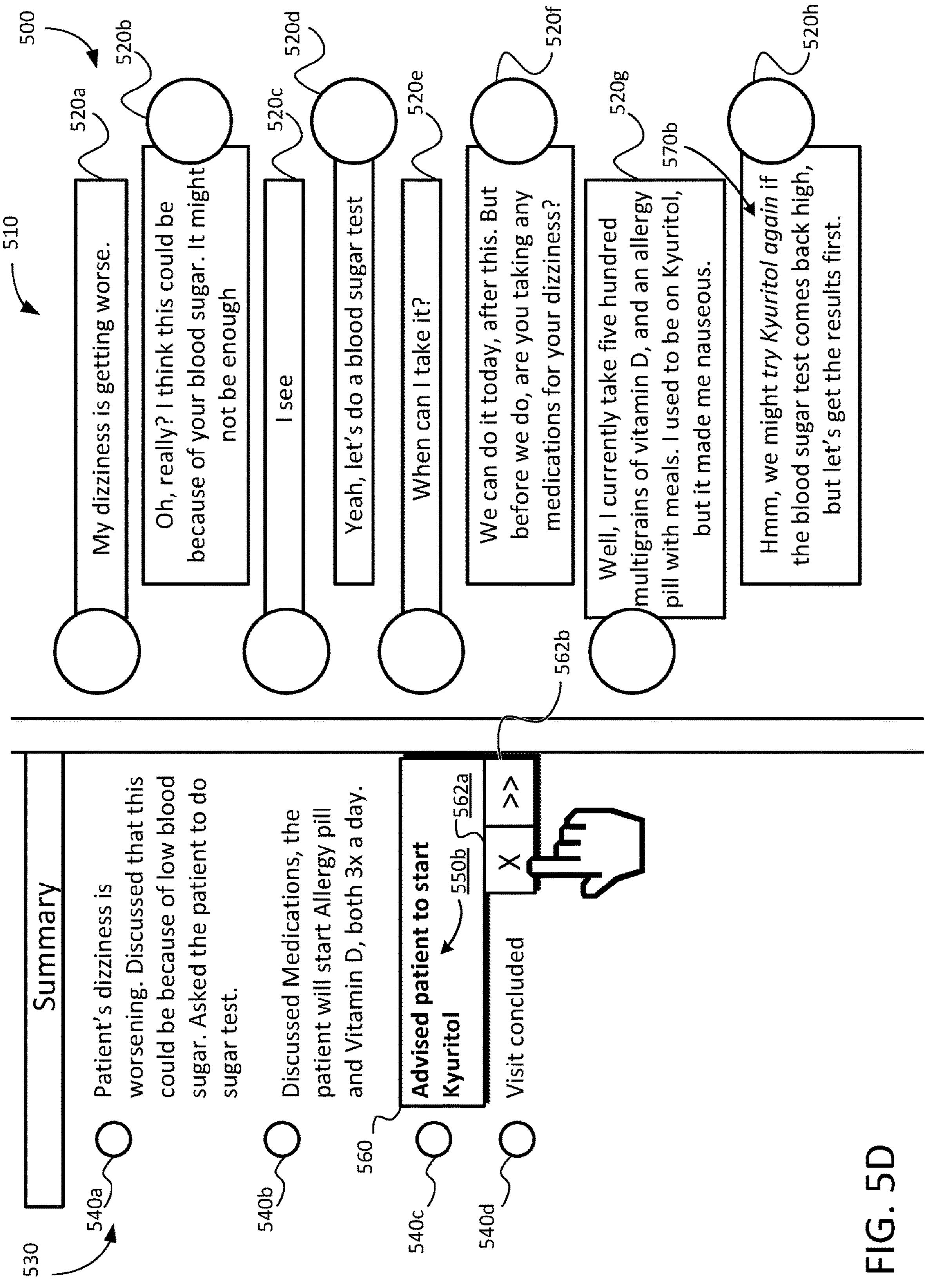

In FIG. 5D, the GUI 500 presents the annotator with a text box 560 showing text of the third representation 540*c* with a second emphasized text 550*b* of "Advised patient to start Kyuritol" for analysis by the annotator. The GUI 500 also applies a different text effect to the second associated text 570*b* in the eighth segment 520*h* to help draw the annotator's attention to at least some of the evidence that the MLM used to generate the second emphasized text 550*b*. The annotator selects the first navigation control 562*a* to initiate editing the emphasized text 550*b*, and the GUI 500 updates to the example shown in FIG. 5E to allow the annotator to begin editing.

Figure 5E:
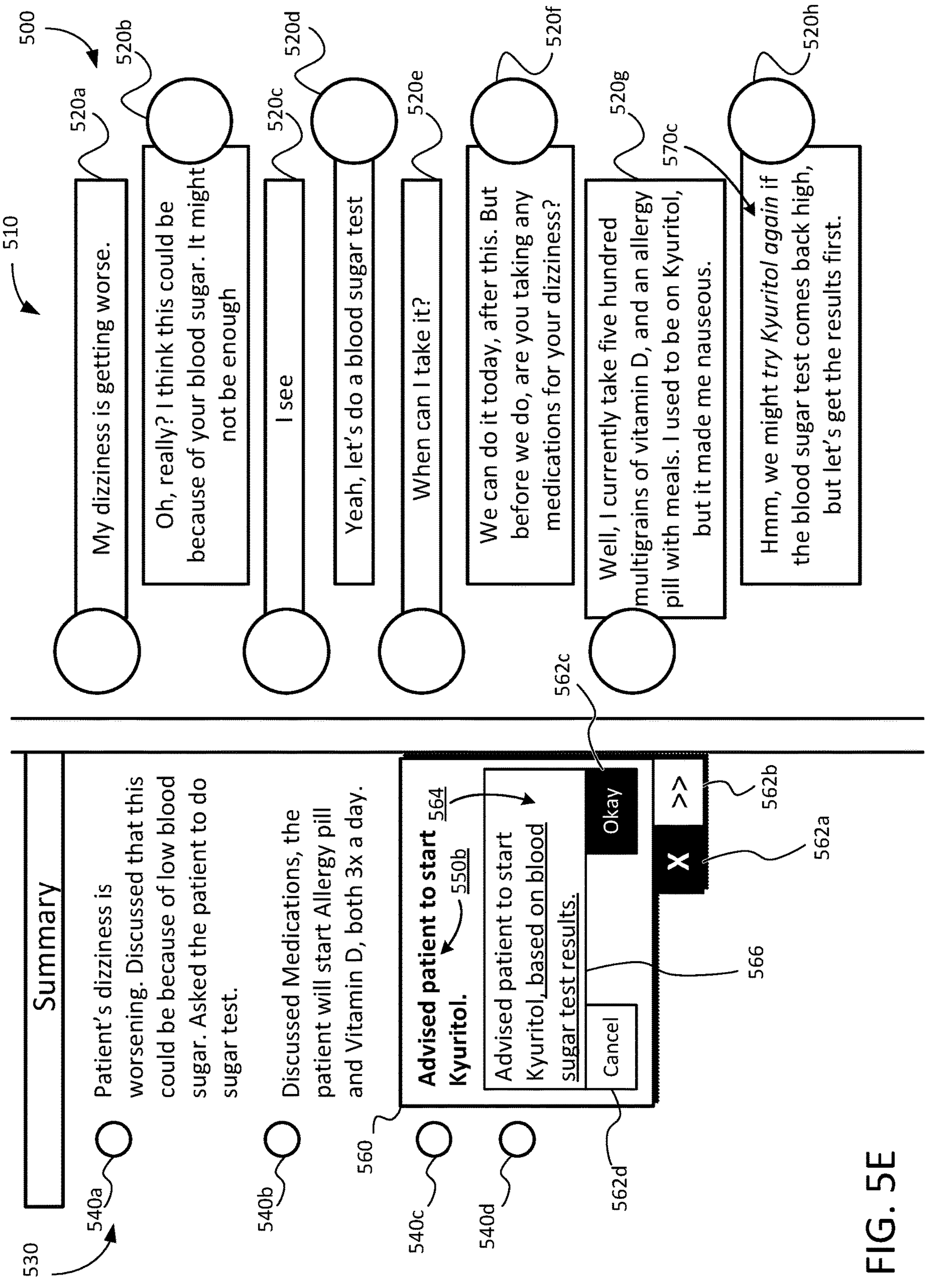

In FIG. 5E, the GUI 500 updates the text box 560 in response to receiving an edit command (e.g., via the first navigation control 562*a*) to display annotated text 564 in an editing box 566. The annotated text 564 can include all or some (e.g., just the emphasized text 550) of the text originally present in the associated representation 540, and indications for text that is subtracted (e.g., via strikethrough effects) and text that is added (e.g., via underline effects), among other effects to indicate other features on the text (e.g., spelling errors, style errors, shifted text, parenthetical or comment text, etc.). When editing text in the transcript 160, the GUI 600 provides audio links 668 to the recorded conversation, which the annotator can select to play back audio from the corresponding portion of the recording to hear what the conversant said, to thereby aid in identifying how to transcribe the conversation.

Figure 5F:
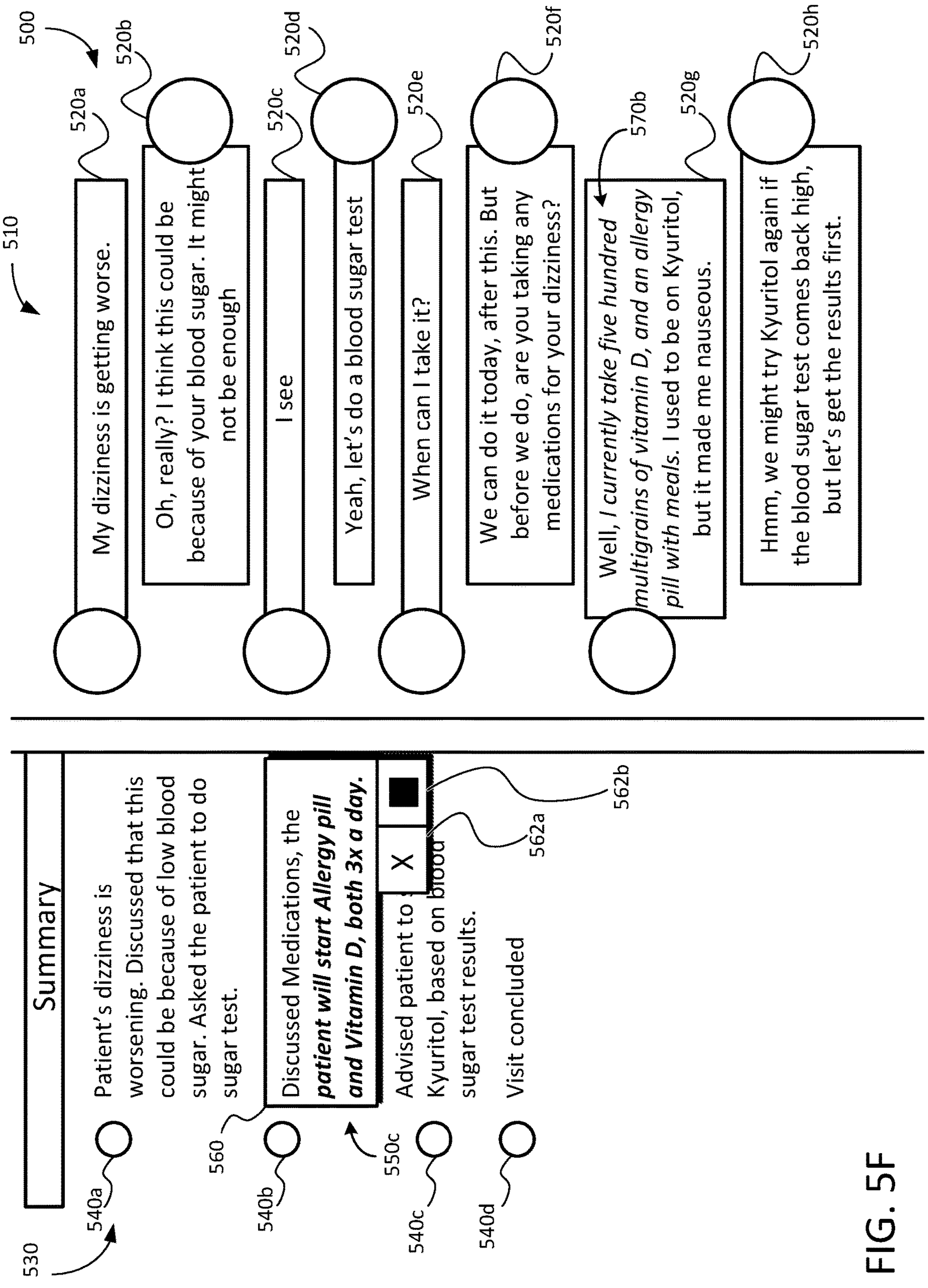

Once the annotator is satisfied with the edits, selection of a third navigation control 562*c* (e.g., an acceptance command) cause the GUI 500 to accept the edits, and proceed to the next candidate to bring to the annotator's attention (e.g., proceeding to FIG. 5F). The GUI 500 updates display of the associated representation 540 based on the accepted edits, which may be displayed with or without formatting to indicate what was editing (or that any edits occurred) in various embodiments.

Alternatively to accepting the edits when satisfied, the annotator may instead cancel or discard the current edits. For example, the annotator can cancel the current edits to restart editing by selection a fourth navigating control 562*d* (e.g., a cancel command) to cause the GUI 500 to revert to an original display of the annotation text 564 in the editing box 566.

Figure 6A:
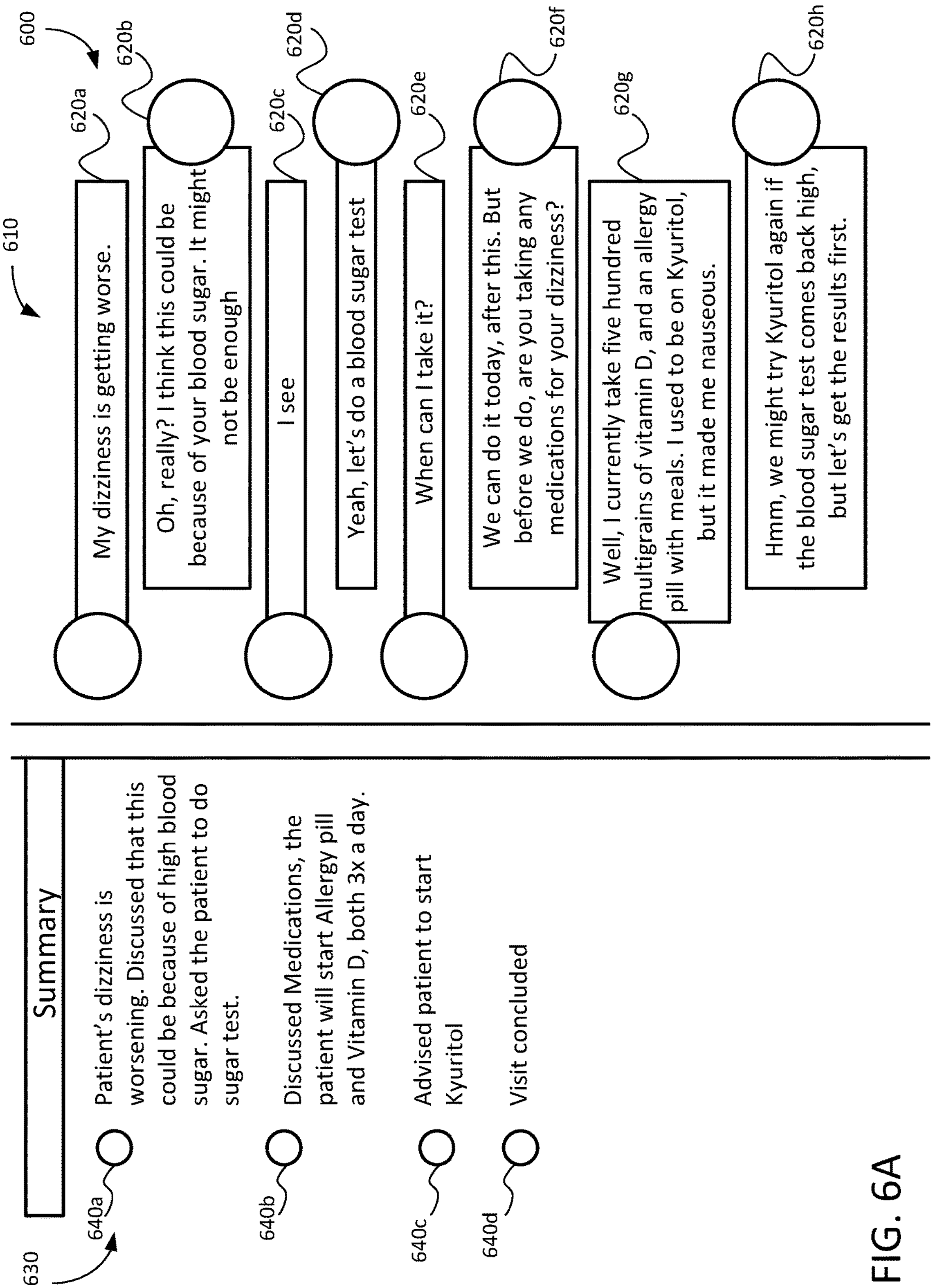
Figure 6B:
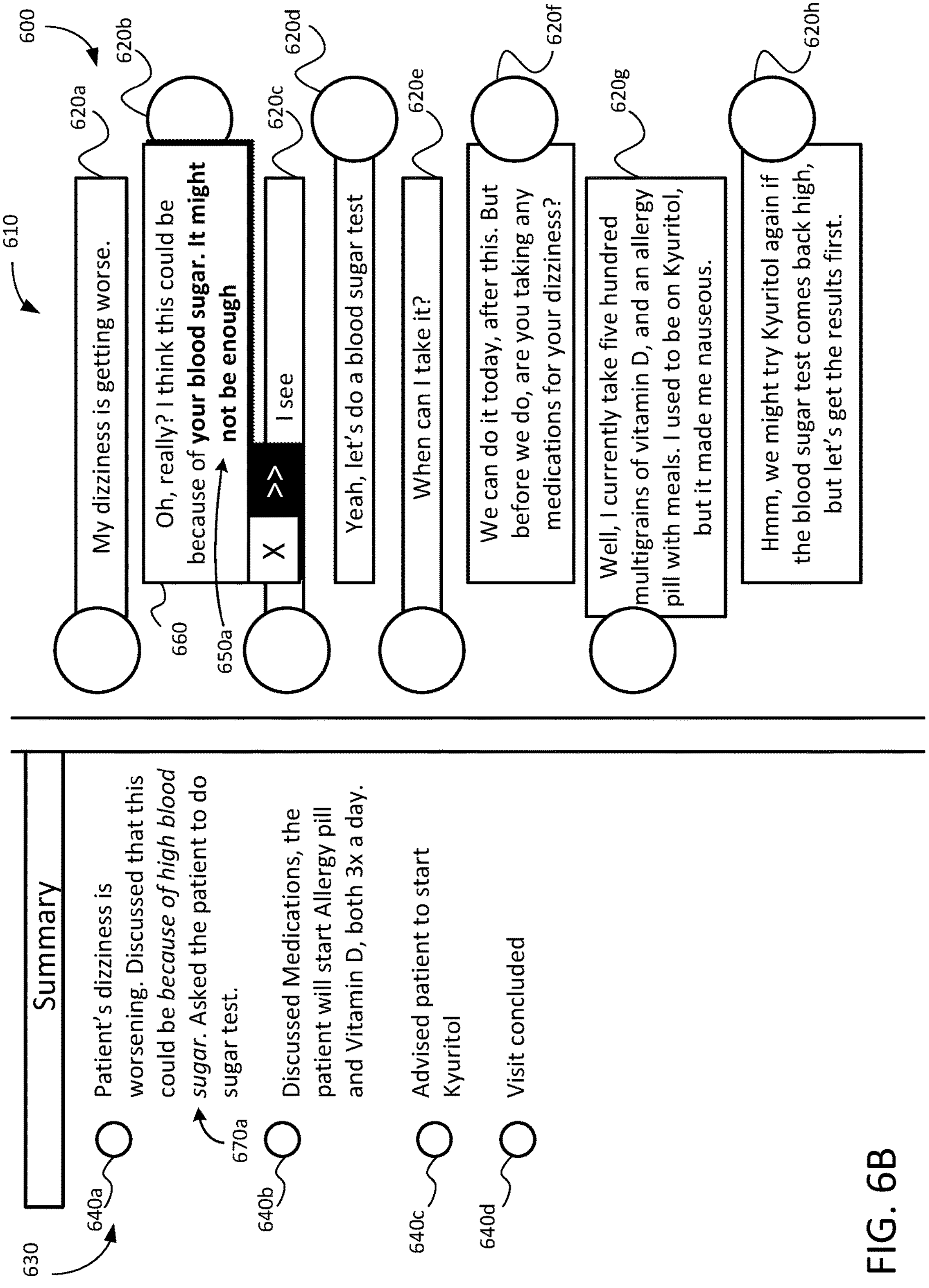
Figure 6C:
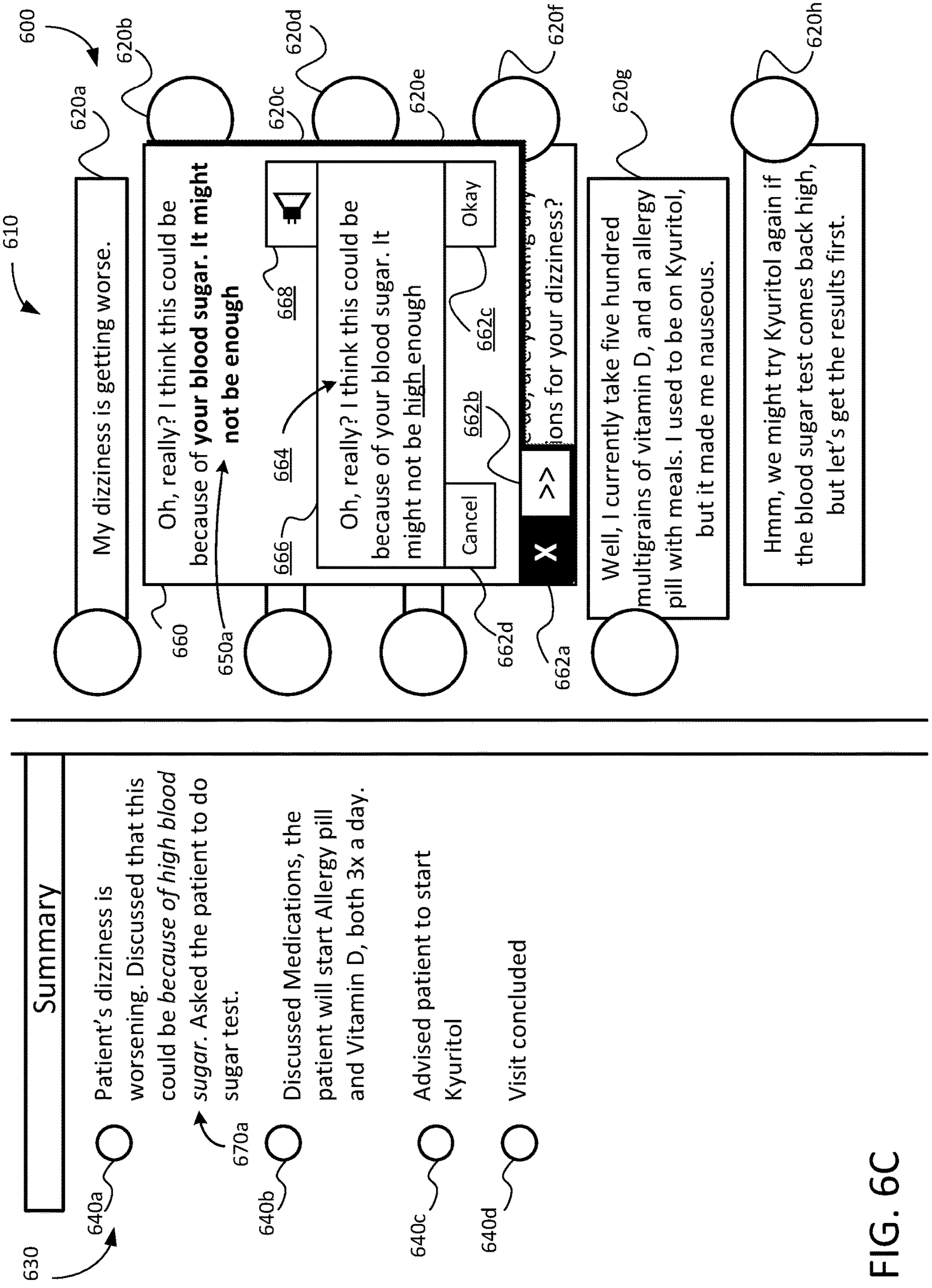
Figure 6D:
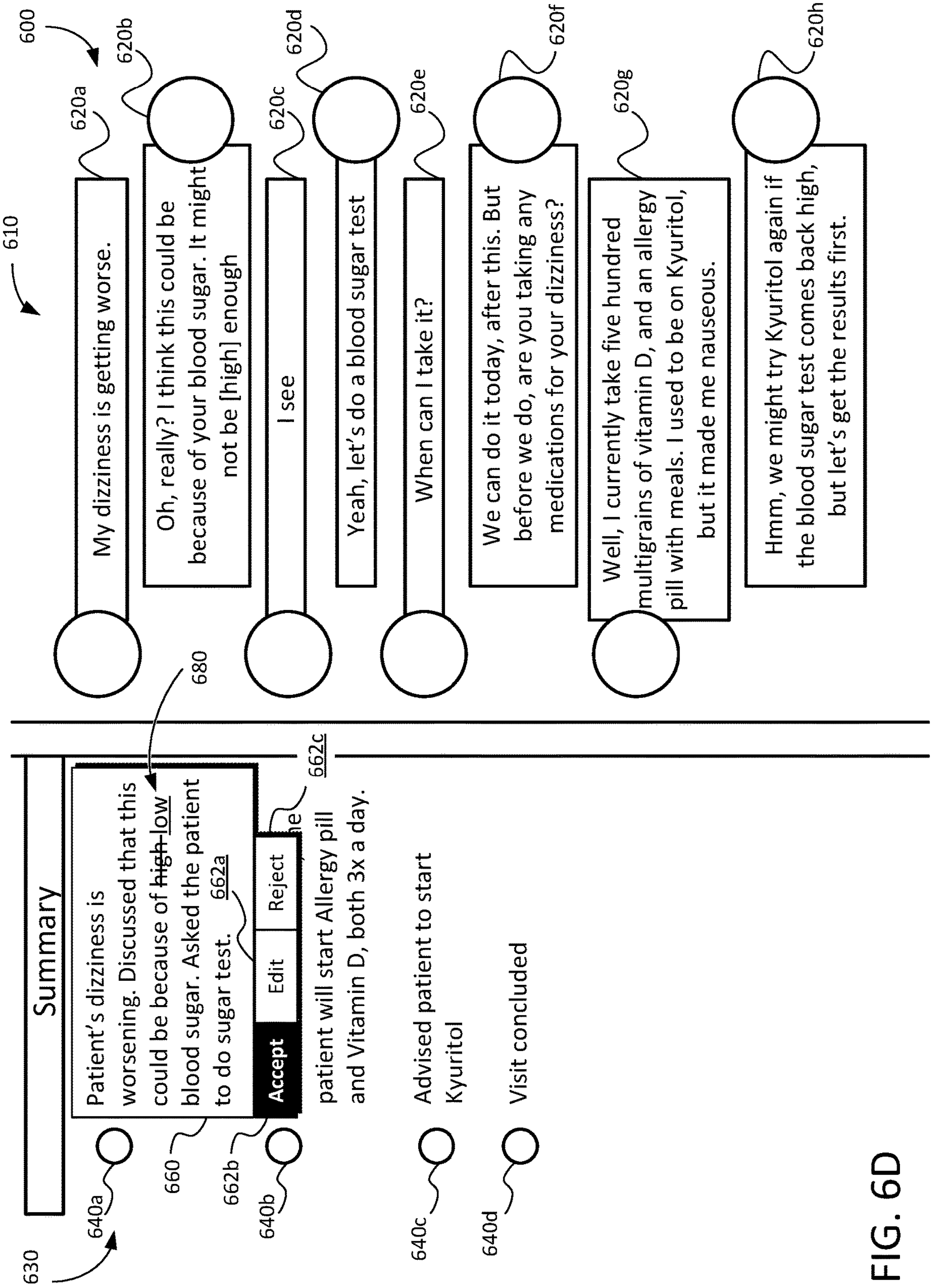

In FIG. 6D, the GUI 600 presents a follow-on editing suggestion to the annotator based on previous edits made by the annotator. The GUI 600 presents the annotator with a text box 660 showing suggested text 680 for a candidate phrase 410 in the first representation 540*a* to replace "high" with "low" as indicated for analysis by the annotator. The suggested text 680 represents newly generated text for a downstream element affected by edits to an upstream element. Accordingly, the MLM may receive the edits made by an annotator during the annotation process and identify any downstream elements that no longer produce similar results (e.g., by applying a fuzzy matching filter), and provide the dissimilar results as suggested text 680 for presentation in the GUI 600.

For example, when the annotator edited the transcript 160 in FIG. 6C to recite that "your blood sugar. It might not be high enough", by adding "high", these edits affect the downstream interpretation shown in the summary 170 in the first associated text 670*a*. Although the MLM initially summarized the emphasized text 650 to indicate that the patient's dizziness could be "because of high blood sugar" based on the initial evidence of the patient's blood sugar "not be[ing] enough", the updated emphasized text changes the MLM's analysis. The changed analysis from the MLM now indicates that the patient's dizziness could be "because of low blood sugar" based on the updated evidence of the patient's blood sugar "not be[ing] high enough".

Accordingly, rather than presenting the associated text 670 affected by carrier edits as a next candidate phrase 410 for the annotator to determine what is wrong with, the GUI 600 can instead present suggested text 680 to the annotator as a starting point for annotation. As shown in the text box 660 in FIG. 6D, the suggested text 680 is provided with formatting applied to indicate that the word "high" is being removed (e.g., via a strikethrough effect) and that the word "low" is being added (e.g., via underlining) in the indicated location in the summary 170.

Figure 6E:
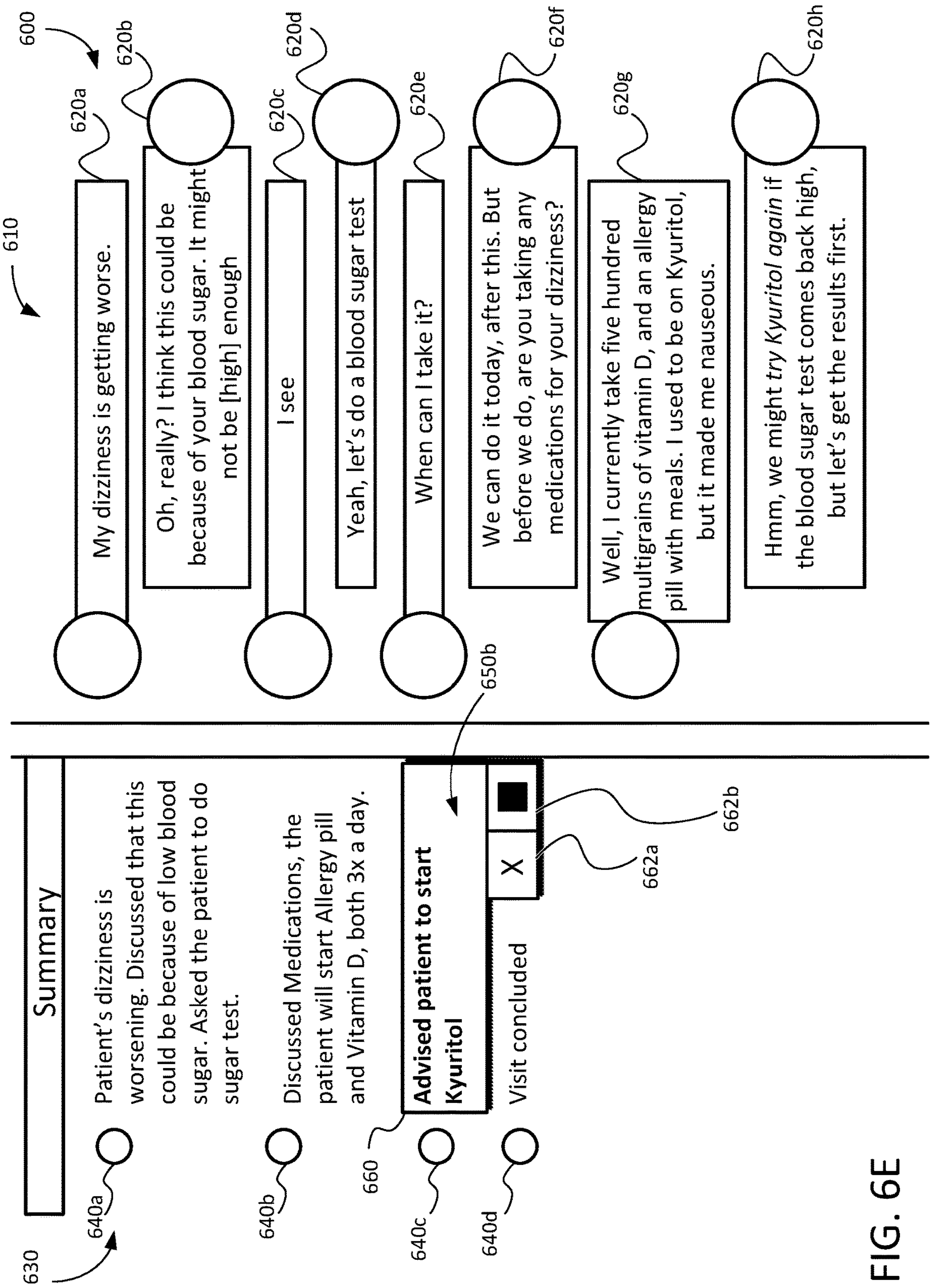

The text box 660 provides a first navigation control 662*a* to allow the annotator to make further or different edits to the text, a second navigation control 662*b* to accept the MLM-generated suggested text 680 to replace the earlier version of the text, and a third navigation control 662 to reject the suggested text 680 and revert back to the earlier version of the text. If the annotator selects to edit the text via the first navigation control 662*a*, the GUI 600 would present an editing box 666 with either the suggested text 680 or the original text (e.g., based on user preference controls) to allow the annotator to change the text manually. If the annotator selects to either accept or reject the suggested text 680, the GUI 600 respectively replaces the original text with the suggested text or retains the original text and proceeds to highlight the next candidate in the combined list 430 to the annotator, as is shown in FIG. 6E.

The GUI 600 presents the suggested text 680 with the associated text or supporting text for the earlier-edited candidate phase, but because the suggested text 680 is generated by the MLM based on the edits received to an earlier-edited candidate phrase, in various embodiments, the GUI 600 can present the suggested text 680 in various sequences relative to the other ranked candidate phrases. For example, the GUI 600 may present the suggested text 680 immediately next in sequence after the annotator finalizes edits to the current candidate phrase 410 (e.g., to maintain the annotator's train of thought) as the next candidate phrase for editing. In another example, to maintain the annotator's utilization rate, instead of or while waiting for the MLM to respond with the suggested text 680, the GUI 600 presents the next candidate phrase from the collective list 430 while querying the MLM for the suggested text 680; staggering when the suggested text 680 is presented in the GUI 600 with the associated text or supporting text for the just-edited candidate phase.

In various embodiments, the GUI 600 can transition between immediate or staggered presentation schema for the suggested text 680 based on estimated or accrued wait time to receive response with suggested text 680 from the MLM. For example, when the current estimated wait time (e.g., N+1 milliseconds) is above a wait threshold (e.g., N milliseconds), or the GUI 600 has been already waiting for a least the wait threshold amount of time, the GUI 600 may display the next candidate phrase according to the current collective list rather than waiting for the MLM to update the ranking in the collective list or provide a suggested text 680.

As illustrated, the second navigation control 562*b* is shown with a different visual effect than the examples shown in FIGS. 5C-5E; a square versus arrows. In various embodiments, the change in visual effect of the second navigation control 562*b* indicates to the annotator that further navigation will complete the annotation process rather than advancing to a next candidate to review. The change in navigation behavior can be the result of the annotator reaching the last candidate phrase 410 in a collective list 430 (or the last candidate phrase 410 above a cutoff threshold 440), or the annotator reaching a resource limit (e.g., having spent X out of X available minutes to review and annotate the output, having reviewed Y out of Y allocated editing candidates) for an annotation process despite the collective list 430 including further entries above a cutoff threshold 440.

On completion of the annotation process, the computing device uploads the changes made by the annotator to a repository to make the indicated changes to the summary 170 and transcript 160. Additionally, the edits (and decisions to not make edits) received from the annotator via the GUI 500 during the annotation process can be uploaded to the repository for use in identifying additional training examples to improve the performance of the MLM via retraining.

Although discussed primarily in relation to forward-only navigation, where the annotator proceeds from the highest ranked (as-of-yet un-annotated) candidate phrase 410 to the next-highest ranked (as-of-yet un-annotated) candidate phrase 410, in various embodiments, the GUI 500 can provide the annotator with a "back" navigation control 562 to return to editing candidate phrases that were initially skipped or otherwise unedited.

In some embodiments, the candidate phrases 410 in the collective list 430 that are skipped by the annotator (e.g., where the annotator selects a forward navigation control 562 without making edits) are treated as completed, and are removed from the collective list 430. In some embodiments, the candidate phrases 410 in the collective list 430 that are skipped by the annotator (e.g., where the annotator selects a forward navigation control 562 without making edits) are re-ranked to be below the previously lowest candidate phrase 410 (that is above the cutoff threshold 440) so that the annotator is re-presented with the skipped editing candidate phrases 410 once the other candidate phrases 410 have been seen at least once.

Although several portions of emphasized text 550 are shown as being identified for individual reasons, in various embodiments, one portion of text can be emphasized for multiple reasons. In various embodiments, different highlighting effects can be used to show that a given portion of text has been emphasized for multiple reasons (e.g., bold for a first emphasis, italics for a second emphasis, with portions affected by the first and second emphases being both bolded and italicized).

FIGS. 6A-6E illustrate GUIs 600 with an annotator editing contents of a transcript 160 and summaries 170 thereof with initial edits made to the summaries 170, according to embodiments of the present disclosure. Using a conversation between a doctor and a patient as a non-limiting example, the GUI 600 illustrated in FIGS. 6A-6E shows a perspective for an annotator adapted interface, but in various embodiments, other conversations may relate to different conversational domains taken from different perspectives than those illustrated in the current example.

FIG. 6A illustrates a first state of the GUI 600, as may be provided to an annotator after initial analysis of an audio recording of a conversation by an NLP system 120. The transcript is shown in a transcript window 610, which includes several segments 620*a*-520*h* (generally or collectively, segment 620) identified within the conversation. In various embodiments, the segments 620 may represent speaker turns in the conversation, sentences identified in the conversation, topics identified in the conversation, a given length of time in the conversation (e.g., every X seconds), combinations thereof, and other divisions of the conversation.

Each segment 620 includes a portion of the written text of the transcript 160, and provides a UI element that allows the user to access the corresponding audio recording, make edits to the transcript, zoom in on the text, and otherwise receive additional detail for the selected portion of the conversation. The transcript illustrated in FIGS. 6A-6E may represent an entire conversation or a portion of the transcript such that the GUI 600 may omit portions of the transcript from initial display. For example, the GUI 600 may initially display only the segments 620 from which key terms or candidate terms appear (e.g., to skip introductory remarks or provide a summary), with the non-displayed segments 620 being omitted from display (e.g., positioned “off screen” for later access), shown as thumbnails, etc.

In various embodiments, additional data or metadata related to the segment 620 (e.g., speaker, topic, confidence in written text accurately matching input audio, whether edited by a user) can be presented based on color or shading of the segment 620 or alignment of the segment 620 in the transcript window 610. For example, the first segment 620*a*, third segment 620*c*, fifth segment 620*e*, and seventh segment 620*g* are shown as left-aligned versus the second segment 620*b*, fourth segment 620*d*, sixth segment 620*f*, and eighth segment 620*h*, which are shown as right-aligned, which indicates different speakers for the differently aligned segments 620. In another example, the seventh segment 620*g* is displayed with a different shading than the other segments 620, which may indicate that the NLP system is confident that human error is present in the third segment 320*c*, that the NLP system is not confident in the transcribed words matching the spoken utterance, or another aspect of the seventh segment 620*g* that deserves additional attention from the annotator.

Depending on the display area available to present the GUI 600, the transcript window 610 may include some or all of the segments 620 at a given time. Accordingly, although not illustrated, in various embodiments, the transcript window 610 may include various content controls (e.g., scroll bars, text size controls, etc.) to enable access to more content than can be legibly displayed at one time on the device outputting the GUI 600. For example, content controls can allow a user to scroll to currently off-screen elements, zoom in on elements below a size threshold or presented as thumbnails when not selected, or the like.

Outside of the transcript window 610, the GUI 600 displays a summary window 630 with one or more summarized representations 640*a-d* (generally or collectively, representation 640). The representations 640 provide summarizations of the key points extracted from the conversation and selectable controls that, in response to selection by a user, adjust the display of the segments 620 in the transcript window 610 to highlight the segments 620 on which the selected representation 640 is based. Accordingly, the representations 640 allow for easy navigation of the transcript based on the extracted summaries.

In FIG. 6B, the GUI 600 presents the annotator with a text box 660 showing text of the second segment 620*b* with a first emphasized text 650*a* (generally or collectively, emphasized text 650) of “your blood sugar. It might not be enough” for analysis by the annotator. The GUI 600 also applies a different text effect to the first associated text 670*a* (generally of collectively, associated text 670) in the first representation 640*a* to help draw the annotator’s attention to at least some of the interpretations drawn by the MLM from the emphasized text 650 to identify why or how the MLM is using the emphasized text 650 as evidence for downstream interpretations.

Although illustrated with the emphasized text 650 used as evidence for associated text of an interpretation in the summary 170, in various embodiments, the MLM can draw evidence from either the summary 170 or the transcript 160, and make interpretations in the transcript 160 or the summary 170. For example, the MLM can use a first interpretation in the transcript 160 for a set of utterances corresponding to a first phrase, and use that interpretation as input in identifying what a second set of utterances correspond to in the transcript 160 (e.g., using contextual cues).

The text box 660 includes navigation controls 662*a-d* (generally or collectively, navigation controls 662) to begin an editing process (e.g., the first navigation control 662*a*), or move to another candidate phrase for editing in the summary 170 or transcript 160 (e.g., the second navigation control 662*b*). In various embodiments, when the user selects the second navigation control 662*b* (as is shown in FIG. 6B), the GUI 600 accepts the selection as an indication that the emphasized text 650 is correct or otherwise not to be edited, and advances to update the display to highlight the next candidate phrase 410 for the annotator’s attention (e.g., according to a collective list 430).

In contrast, when the user selects the first navigation control 662*a* (as is shown in FIG. 6C), the GUI 600 accepts the selection as an indication that the emphasized text 650 is to be edited, and the GUI 600 updates the text box 660 to display annotated text 664 in an editing box 666. The annotated text 664 can include all or some (e.g., just the emphasized text 650) of the text originally presented in the associated segment 620, and indications for text that is subtracted (e.g., via strikethrough effects) and text that is added (e.g., via underline effects), among other effects to indicate other features on the text (e.g., spelling errors, style errors, shifted text, parenthetical or comment text, etc.).

Once the annotator is satisfied with the edits, selection of a third navigation control 662*c* (e.g., an acceptance command) cause the GUI 600 to accept the edits, and proceed to the next candidate phrase to bring to the annotator's attention (e.g., proceeding to FIG. 6D). The GUI 600 updates display of the associated segment 620 based on the accepted edits, which may be displayed with or without formatting to indicate what was editing (or that any edits occurred) in various embodiments.

Alternatively to accepting the edits when satisfied, the annotator may instead cancel or discard the current edits. For example, the annotator can cancel the current edits to restart editing by selecting a fourth navigation control 662*d* (e.g., a cancel command) to cause the GUI 600 to revert to an original display of the annotation text 664 in the editing box 666.

In FIG. 6D, the GUI 600 presents a text box 660 that includes a suggested text 680 to the underlying text, based on edits predicted by the MLM from previous annotations made by the annotator. Because the annotator can make annotations to upstream portions of the analysis output of the MLM, the MLM may reevaluate the downstream analysis output in response to the annotator editing the transcript 160 or summary 170. In various embodiments, the MLM may identify portions of the transcript 160 or summary 170 that are potentially affected by the earlier edits, and update the ranking of those portions in the collective list 430 accordingly. Additionally, the MLM may use the earlier edits to generate suggestions that are presented to the annotator for how the earlier edits now affect the downstream portions.

Continuing the example from FIG. 6C, the annotator made edits to the text of the transcript 160 to indicate that the conversant said that the cause of dizziness may be that the patient's blood sugar "might not be high enough"; adding the word "high". This addition affects the MLM's initial analysis of the transcript 160 to produce the initially associated text 670*a* in the summary 170 that the patient's dizziness might be "because of high blood sugar" (e.g., based on the originally transcribed statement of "might not be enough").

Accordingly, on reanalysis, using the updated text from the transcript 160, the MLM identifies a new analysis output for the summary 170 that the patient's dizziness might be "because of low blood sugar". The MLM communicates the new analysis output to the GUI 600, which displays the differences between the initial and new analysis outputs as the suggested text 680. As illustrated, the suggested text 680 shows the change from "low" to "high" as the determined reason for the patient's dizziness, which the annotator may accept or reject for replacement in the summary 170.

In various embodiments, because the MLM is queried for whether a new output would be generated based on changes to the inputs, the GUI 600 may order presentation of the suggested text 680 to come immediately after the edits to the inputs (e.g., potentially asking the annotator to wait before seeing a next candidate phrase related to the previously edited candidate phrase), or after another editing candidate (e.g., potentially dividing the annotator's attention from a series of related edits while waiting on the MLM to respond).

For example, a collective list 430 may include ordered first through fourth candidate phrases 410*a-d* and after receiving an edit to the first candidate phrase 410*a*, the GUI 600 may display a suggested text 680 to the third candidate phrase 410*c* before displaying the second candidate phrase 410*b* (e.g., immediate presentation), and then present the second candidate phrase 410*b* followed by the fourth candidate phrase 410*d*.

In another example, a collective list 430 may include ordered first through fourth candidate phrases 410*a-d* and after receiving an edit to the first candidate phrase 410*a* that (potentially) affects the third candidate phrase 410*c*, the GUI 600 may display the second candidate phrase 410*b* and/or the fourth candidate phrase 410*d* (e.g., staggered presentation) while waiting for a response from the MLM for whether a suggested text 680 is available for the third candidate phrase 410*c*.

In FIG. 6E, the GUI 600 presents the annotator with a text box 660 showing text of the third representation 640*c* with a second emphasized text 650*b* of "Advised patient to start Kyuritol" for analysis by the annotator. As illustrated, the second navigation control 662*b* is shown with a different visual effect than the examples shown in FIGS. 6B-6D; a square versus arrows. In various embodiments, the change in visual effect of the second navigation control 662*b* indicates to the annotator that further navigation will complete the annotation process rather than advancing to a next candidate phrase to review. The change in navigation behavior can be the result of the annotator reaching the last candidate phrase 410 in a collective list 430 (or the last candidate phrase 410 above a cutoff threshold 440), or the annotator reaching a resource limit (e.g., having spent X out of X available minutes to review and annotate the output, having reviewed Y out of Y allocated candidate phrases) for an annotation process despite the collective list 430 including further entries above a cutoff threshold 440.

On completion of the annotation process, the computing device uploads the changes made by the annotator to a repository to make the indicated changes to the summary 170 and transcript 160. Additionally, the edits (and decisions to not make edits) received from the annotator via the GUI 600 during the annotation process can be uploaded to the repository for use in identifying additional training examples to improve the performance of the MLM via retraining.

Although discussed primarily in relation to forward-only navigation, where the annotator proceeds from the highest ranked (as-of-yet un-annotated) candidate phrase 410 to the next-highest ranked (as-of-yet un-annotated) candidate phrase 410, in various embodiments, the GUI 600 can provide the annotator with a "back" navigation control 662 to return to editing candidate phrases that were initially skipped or otherwise unedited.

In some embodiments, the candidate phrases 410 in the collective list 430 that are skipped by the annotator (e.g., where the annotator selects a forward navigation control 662 without making edits) are treated as completed, and are removed from the collective list 430. In some embodiments, the candidate phrases 410 in the collective list 430 that are skipped by the annotator (e.g., where the annotator selects a forward navigation control 662 without making edits) are re-ranked to be below the previously lowest candidate phrase 410 (that is above the cutoff threshold 440) so that the annotator is re-presented with the skipped candidate phrases 410 once the other candidate phrases 410 have been seen at least once.

Although several portions of emphasized text 650 are shown as being identified for individual reasons, in various embodiments, one portion of text can be emphasized for multiple reasons. In various embodiments, different highlighting effects can be used to show that a given portion of text has been emphasized for multiple reasons (e.g., bold for a first emphasis, italics for a second emphasis, with portions affected by the first and second emphases being both bolded and italicized).

FIG. 7 is a flowchart of an example method 700 for edit attention management, according to embodiments of the present disclosure. Example method 700 begins at block 710, where a computing device provides a review graphical user interface (GUI) including an analysis output, generated by an MLM. In various embodiments, the analysis output is of a natural language conversation, and the analysis output including a transcript of the conversation, and a summary of the natural language conversation based on the transcript.

At block 720, the computing device identifies ranked candidate phrases in the transcript, the summary, or both for editing or bringing to an annotator's attention for editing. For example, the computing device can identify a first candidate phrase, a second candidate phrase, a third candidate phrase, etc. in the analysis output. The candidate phrases are ranked according to various criteria in various embodiments including one or more of: order in the conversation, frequency of use in the conversation, certainty in the output requested by an end-user, the MLM's confidence (or lack thereof) in the accuracy of the output, and how a sequential pipeline design in the MLM handles the various inputs and downstream outputs, and combinations thereof that take the relative rankings of other identified candidate phrases into consideration as well.

In various embodiments, the MLM may adjust the order or ranking of the candidate phrases as the annotator reviews the analysis output. For example, a set of candidate phrases may initially be provided with a first, second, and third example in a corresponding order for display, but the GUI may display the third candidate phrase with emphasis before displaying the second candidate phrase with emphasis (if emphasizing at all) based on edits received to the first candidate phrase.

At block 730, the computing device emphasizes one candidate phrase in the review GUI. In various embodiments, the emphasis is provided by various text effects (e.g., bold, italic, strikethrough, underline, all caps), colors applied to the text or background on which the text is shown, size of the elements in the GUI relative to deemphasized or not emphasized elements, animation effects applied to the text or surrounding backgrounds, etc.

At block 740, the computing device emphasizes supporting phrases or summarized phrases related to the candidate phrase highlighted currently in the review GUI. The GUI uses a different set of emphasis techniques than those used in block 730, to draw the annotator's attention in the GUI, but to also indicate which element is the primarily emphasized element. In various embodiments, the computing device queries the MLM for supporting phrases in the transcript or associated text in the summary that are related to the emphasized text (e.g., as upstream inputs or downstream outputs that use the emphasized text as an input) to provide additional context in why the emphasized text is being emphasized or how the emphasized text might be edited.

At block 750, the computing device receives a review action via the review GUI. In some embodiments, the review action marks the emphasized candidate phrase as correct without replacing the emphasized candidate phrase with an alternative or otherwise changing the contents of the emphasized candidate phrase. In some embodiments, the review action marks the emphasized candidate phrase as incorrect, and the GUI receives receiving a replacement phrase for or edits to the emphasized candidate phrase.

At block 760, in response to receiving the review action in relation to the currently displayed candidate phrase (per block 750), the computing device deemphasizes the currently emphasized candidate phrase. When handling edits to the emphasized candidate phrase (received per block 750), the GUI may deemphasize the emphasized candidate phrase by replacing the emphasized candidate phrase with the replacement phrase in an un-emphasized format.

Example method 700 returns to block 720 from block 760 to identify the next candidate phrase according to the ranking of candidate phrases. Method 700 may continue as new review actions are received, emphasizing (per block 730) new candidate phrases (and associated supporting text or associate text elements per block 740) until the annotator reaches an end of the list of candidate phrases for annotation, or a set amount of resources are consumed by the annotation process.

FIG. 8 illustrates physical components of an example computing device 800 according to embodiments of the present disclosure. The computing device 800 may include at least one processor 810, a memory 820, and a communication interface 830.

The processor 810 may be any processing unit capable of performing the operations and procedures described in the present disclosure. In various embodiments, the processor 810 can represent a single processor, multiple processors, a processor with multiple cores, and combinations thereof.

The memory 820 is an apparatus that may be either volatile or non-volatile memory and may include RAM, flash, cache, disk drives, and other computer readable memory storage devices. Although shown as a single entity, the memory 820 may be divided into different memory storage elements such as RAM and one or more hard disk drives. As used herein, the memory 820 is an example of a device that includes computer-readable storage media, and is not to be interpreted as transmission media or signals per se.

As shown, the memory 820 includes various instructions that are executable by the processor 810 to provide an operating system 822 to manage various features of the computing device 800 and one or more programs 824 to provide various functionalities to users of the computing device 800, which include one or more of the features and functionalities described in the present disclosure. One of ordinary skill in the relevant art will recognize that different approaches can be taken in selecting or designing a program 824 to perform the operations described herein, including choice of programming language, the operating system 822 used by the computing device, and the architecture of the processor 810 and memory 820. Accordingly, the person of ordinary skill in the relevant art will be able to select or design an appropriate program 824 based on the details provided in the present disclosure.

Additionally, the memory 820 can include one or more of machine learning models 826 for speech recognition and analysis, as described in the present disclosure. As used herein, the machine learning models 826 may include various algorithms used to provide "artificial intelligence" to the computing device 800, which may include Artificial Neural Networks, decision trees, support vector machines, genetic algorithms, Bayesian networks, or the like. The models may include publically available services (e.g., via an Application Program Interface with the provider) as well as purpose-trained or proprietary services. One of ordinary skill in the relevant art will recognize that different domains may benefit from the use of different machine learning models 826, which may be continuously or periodically trained based on received feedback. Accordingly, the person of ordinary skill in the relevant art will be able to select or design an appropriate machine learning model 826 based on the details provided in the present disclosure.

The communication interface 830 facilitates communications between the computing device 800 and other devices, which may also be computing devices 800 as described in relation to FIG. 8. In various embodiments, the communication interface 830 includes antennas for wireless communications and various wired communication ports. The computing device 800 may also include or be in communication, via the communication interface 830, one or more input devices (e.g., a keyboard, mouse, pen, touch input device, etc.) and one or more output devices (e.g., a display, speakers, a printer, etc.).

Accordingly, the computing device 800 is an example of a system that includes a processor 810 and a memory 820 that includes instructions that (when executed by the processor 810) perform various embodiments of the present disclosure. Similarly, the memory 820 is an apparatus that includes instructions that when executed by a processor 810 perform various embodiments of the present disclosure.

Programming modules, may include routines, programs, components, data structures, and other types of structures that may perform particular tasks or that may implement particular abstract data types. Moreover, embodiments may be practiced with other computer system configurations, including hand-held devices, multiprocessor systems, microprocessor-based or programmable user electronics, minicomputers, mainframe computers, and the like. Embodiments may also be practiced in distributed computing environments where tasks are performed by remote processing devices that are linked through a communications network. In a distributed computing environment, programming modules may be located in both local and remote memory storage devices.

Furthermore, embodiments may be practiced in an electrical circuit comprising discrete electronic elements, packaged or integrated electronic chips containing logic gates, a circuit using a microprocessor, or on a single chip containing electronic elements or microprocessors (e.g., a system-on-a-chip (SoC)). Embodiments may also be practiced using other technologies capable of performing logical operations such as, for example, AND, OR, and NOT, including, but not limited to, mechanical, optical, fluidic, and quantum technologies. In addition, embodiments may be practiced within a general purpose computer or in any other circuits or systems.

Embodiments may be implemented as a computer process (method), a computing system, or as an article of manufacture, such as a computer program product or computer-readable storage medium. The computer program product may be a computer-readable storage medium readable by a computer system and encoding a computer program of instructions for executing a computer process. Accordingly, hardware or software (including firmware, resident software, micro-code, etc.) may provide embodiments discussed herein. Embodiments may take the form of a computer program product on a computer-usable or computer-readable storage medium having computer-usable or computer-readable program code embodied in the medium for use by, or in connection with, an instruction execution system.

Although embodiments have been described as being associated with data stored in memory and other storage mediums, data can also be stored on or read from other types of computer-readable media, such as secondary storage devices, like hard disks, floppy disks, or a CD-ROM, or other forms of RAM or ROM. The term computer-readable storage medium refers only to devices and articles of manufacture that store data or computer-executable instructions readable by a computing device. The term computer-readable storage medium does not include computer-readable transmission media.

Embodiments described in the present disclosure may be used in various distributed computing environments where tasks are performed by remote processing devices that are linked through a communications network.

Embodiments described in the present disclosure may be implemented via local and remote computing and data storage systems. Such memory storage and processing units may be implemented in a computing device. Any suitable combination of hardware, software, or firmware may be used to implement the memory storage and processing unit. For example, the memory storage and processing unit may be implemented with computing device 800 or any other computing devices, in combination with computing device 800, wherein functionality may be brought together over a network in a distributed computing environment, for example, an intranet or the Internet, to perform the functions as described herein. The systems, devices, and processors described herein are provided as examples; however, other systems, devices, and processors may comprise the aforementioned memory storage and processing unit, consistent with the described embodiments.

The descriptions and illustrations of one or more embodiments provided in this application are intended to provide a thorough and complete disclosure of the full scope of the subject matter to those of ordinary skill in the relevant art and are not intended to limit or restrict the scope of the subject matter as claimed in any way. The embodiments, examples, and details provided in this disclosure are considered sufficient to convey possession and enable those of ordinary skill in the relevant art to practice the best mode of the claimed subject matter. Descriptions of structures, resources, operations, and acts considered well-known to those of ordinary skill in the relevant art may be brief or omitted to avoid obscuring lesser known or unique aspects of the subject matter of this disclosure. The claimed subject matter should not be construed as being limited to any embodiment, aspect, example, or detail provided in this disclosure unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently.

Having been provided with the description and illustration of the present disclosure, one of ordinary skill in the relevant art may envision variations, modifications, and alternative embodiments falling within the spirit of the broader aspects of the general inventive concept provided in this disclosure that do not depart from the broader scope of the present disclosure.

As used in the present disclosure, a phrase referring to "at least one of" a list of items refers to any set of those items, including sets with a single member, and every potential combination thereof. For example, when referencing "at least one of A, B, or C" or "at least one of A, B, and C", the phrase is intended to cover the sets of: A, B, C, A-B, B-C, and A-B-C, where the sets may include one or multiple instances of a given member (e.g., A-A, A-A-A, A-A-B, A-A-B-B-C-C-C, etc.) and any ordering thereof.

As used in the present disclosure, the term "determining" encompasses a variety of actions that may include calculating, computing, processing, deriving, investigating, looking up (e.g., via a table, database, or other data structure), ascertaining, receiving (e.g., receiving information), accessing (e.g., accessing data in a memory), retrieving, resolving, selecting, choosing, establishing, and the like.

The following claims are not intended to be limited to the embodiments shown herein, but are to be accorded the full scope consistent with the language of the claims. Within the claims, reference to an element in the singular is not intended to mean "one and only one" unless specifically stated as such, but rather as "one or more" or "at least one". Unless specifically stated otherwise, the term "some" refers to one or more. No claim element is to be construed under the provision of 35 U.S.C. § 112(f) unless the element is expressly recited using the phrase "means for" or "step for". All structural and functional equivalents to the elements of the various embodiments described in the present disclosure that are known or come later to be known to those of ordinary skill in the relevant art are expressly incorporated herein by reference and are intended to be encompassed by the claims. Moreover, nothing disclosed in the present disclosure is intended to be dedicated to the public regardless of whether such disclosure is explicitly recited in the claims.

We claim:

1. A method, comprising:

generating a review graphical user interface (GUI) for display;

rendering, within the review GUI, an analysis output, generated by a machine learning model, of a natural language conversation, the analysis output including a transcript and a summary of the natural language conversation based on the transcript;

identifying a first candidate phrase and a second candidate phrase in the analysis output;

modifying the rendered analysis output by emphasizing the first candidate phrase in the review GUI;

in response to receiving a review action from a user marking the first candidate phrase as incorrect:

receiving a replacement phrase for the first candidate phrase; and modifying the review GUI by replacing the first candidate phrase with the replacement phrase within the review GUI in response to modifying the review GUI to replace the first candidate phrase, identifying a third candidate phrase;

modifying the review GUI to emphasize the third candidate phrase; and in response to receiving a second review action from the user associated with the third candidate phrase, modifying the review GUI to de-emphasize the third candidate phrase and to emphasize the second candidate phrase in the review GUI.

2. The method of claim 1, wherein the first candidate phrase is included in a first one of the transcript and the summary and the second candidate phrase is included in a second one of the transcript and the summary.

3. The method of claim 2, wherein the first candidate phrase is included in the summary and emphasizing the first candidate phrase in the review GUI further comprises:

querying the machine learning model for supporting phrases in the transcript to support initial selection of the first candidate phrase for inclusion in the analysis output; and emphasizing the supporting phrases in the transcript in a different format than the first candidate phrase is emphasized with.

4. The method of claim 2, wherein the first candidate phrase is included in the transcript and emphasizing the first candidate phrase in the review GUI further comprises: querying the machine learning model for associated text in the summary based on the first candidate phrase; and emphasizing the associated text in the summary in a different format than the first candidate phrase is emphasized with.

5. The method of claim 1, wherein the first candidate phrase is positioned later in the transcript than the second candidate phrase.

6. The method of claim 1, wherein the first candidate phrase is positioned later in the summary than the second candidate phrase.

7. The method of claim 1, wherein the first candidate phrase is assigned a lower confidence level than the second candidate phrase by the machine learning model when generating the analysis output.

8. The method of claim 1, wherein the first candidate phrase is assigned a higher certainty demand level than the second candidate phrase by the user for generating the analysis output.

9. The method of claim 1, wherein the first candidate phrase is determined by the machine learning model earlier in a sequential pipeline than the second candidate phrase when generating the analysis output.

10. The method of claim 1, further comprising:

determining an allotted review resource pool; and in response to determining that a combination of the first candidate phrase, the second candidate phrase, and the third candidate phrase exceeds the allotted review resource pool:

selecting the first candidate phrase and the second candidate phrase for presentation in the review GUI; and discarding the third candidate phrase for review.

11. A non-transitory computer-readable storage medium storing executable instructions that, when executed by a hardware processor, cause the hardware processor to perform steps comprising:

generating a review graphical user interface (GUI) for display;

rendering, within the review GUI, an analysis output, generated by a machine learning model, of a natural language conversation, the analysis output including a transcript and a summary of the natural language conversation based on the transcript;

identifying a first candidate phrase and a second candidate phrase in the analysis output;

modifying the rendered analysis output by emphasizing the first candidate phrase in the review GUI;

in response to receiving a review action from a user marking the first candidate phrase as incorrect:

receiving a replacement phrase for the first candidate phrase; and modifying the review GUI by replacing the first candidate phrase with the replacement phrase within the review GUI;

in response to modifying the review GUI to replace the first candidate phrase, identifying a third candidate phrase;

modifying the review GUI to emphasize the third candidate phrase; and in response to receiving a second review action from the user associated with the third candidate phrase, modifying the review GUI to de-emphasize the third candidate phrase and to emphasize the second candidate phrase in the review GUI.

12. The non-transitory computer-readable storage medium of claim 11, wherein the first candidate phrase is included in a first one of the transcript and the summary and the second candidate phrase is included in a second one of the transcript and the summary.

13. The non-transitory computer-readable storage medium of claim 12, wherein the first candidate phrase is included in the summary and emphasizing the first candidate phrase in the review GUI further comprises:

querying the machine learning model for supporting phrases in the transcript to support initial selection of the first candidate phrase for inclusion in the analysis output; and emphasizing the supporting phrases in the transcript in a different format than the first candidate phrase is emphasized with.

14. The non-transitory computer-readable storage medium of claim 13, wherein the first candidate phrase is included in the transcript and emphasizing the first candidate phrase in the review GUI further comprises:

querying the machine learning model for associated text in the summary based on the first candidate phrase; and emphasizing the associated text in the summary in a different format than the first candidate phrase is emphasized with.

15. The non-transitory computer-readable storage medium of claim 11, wherein the first candidate phrase is positioned later in the transcript than the second candidate phrase.

16. The non-transitory computer-readable storage medium of claim 11, wherein the first candidate phrase is positioned later in the summary than the second candidate phrase.

17. The non-transitory computer-readable storage medium of claim 11, wherein the first candidate phrase is assigned a lower confidence level than the second candidate phrase by the machine learning model when generating the analysis output.

18. The non-transitory computer-readable storage medium of claim 11, wherein the first candidate phrase is assigned a higher certainty demand level than the second candidate phrase by the user for generating the analysis output.

19. The non-transitory computer-readable storage medium of claim 11, wherein the first candidate phrase is determined by the machine learning model earlier in a sequential pipeline than the second candidate phrase when generating the analysis output.

20. The non-transitory computer-readable storage medium of claim 11, wherein the instructions, when executed by the hardware processor, cause the hardware processor to perform further steps comprising:

determining an allotted review resource pool; and in response to determining that a combination of the first candidate phrase, the second candidate phrase, and the third candidate phrase exceeds the allotted review resource pool:

selecting the first candidate phrase and the second candidate phrase for presentation in the review GUI; and discarding the third candidate phrase for review.

* * * * *